United States Patent [19]

Kawaguchi et al.

[11] Patent Number: 5,552,988
[45] Date of Patent: Sep. 3, 1996

[54] POWER UNIT FOR MOTOR VEHICLES

[75] Inventors: Kenji Kawaguchi, Tokyo; Shoji Motodate, Saitama; Masayuki Toriyama, Saitama; Satoshi Honda, Saitama; Takaaki Fujii, Saitama; Toshiyuki Cho, Saitama, all of Japan

[73] Assignee: Honda Giken Kogyo Kabushiki Kaisha, Tokyo, Japan

[21] Appl. No.: 354,730

[22] Filed: Dec. 6, 1994

Related U.S. Application Data

[62] Division of Ser. No. 939,702, Sep. 2, 1992, Pat. No. 5,406,154.

[30] Foreign Application Priority Data

Sep. 3, 1991 [JP] Japan ................... 3-223182
Oct. 14, 1991 [JP] Japan ................... 3-293693

[51] Int. Cl.$^6$ .................................................. B62D 61/02
[52] U.S. Cl. ........................... 364/426.01; 180/65.4; 180/65.8
[58] Field of Search ............... 364/426.01, 426.02, 364/424.07; 303/93, 95, 100, 103; 180/220, 221, 65.3, 65.4, 65.6, 65.8

[56] References Cited

U.S. PATENT DOCUMENTS

| | | | |
|---|---|---|---|
| 3,809,935 | 5/1974 | Kristen et al. | 310/68 D |
| 4,230,901 | 10/1980 | Wengler et al. | 174/52.2 |
| 4,401,926 | 8/1983 | Morton et al. | 318/376 |
| 4,532,460 | 7/1985 | Gale et al. | 318/139 |
| 4,668,898 | 5/1987 | Harms et al. | 310/67 R |
| 4,755,699 | 7/1988 | Schmider | 310/68 R |
| 4,951,769 | 8/1990 | Kawamura | 180/65.4 |
| 4,952,829 | 8/1990 | Armbruster et al. | 310/68 R |
| 4,994,973 | 2/1991 | Makino et al. | 364/424.07 |
| 5,078,227 | 1/1992 | Becker | 180/221 |
| 5,101,924 | 4/1992 | Yamagiwa et al. | 180/58.8 |
| 5,148,883 | 9/1992 | Tanaka et al. | 364/426.02 |

FOREIGN PATENT DOCUMENTS

| | | |
|---|---|---|
| 096468 | 12/1983 | European Pat. Off. . |
| 203846 | 12/1986 | European Pat. Off. . |
| 408074 | 1/1991 | European Pat. Off. . |
| 457594 | 11/1991 | European Pat. Off. . |
| 469995 | 2/1992 | European Pat. Off. . |
| 153307 | 5/1973 | France . |
| 905624 | 8/1970 | Germany . |
| 180848 | 6/1976 | Japan . |
| 212446 | 4/1977 | Japan . |
| 438053 | 3/1979 | Japan . |
| 128789 | 5/1991 | Japan . |
| 159011 | 11/1985 | United Kingdom . |
| 201309 | 8/1988 | United Kingdom . |

*Primary Examiner*—Gary Chin

[57] ABSTRACT

A regenerative braking system in a motor vehicle determines a state of deceleration on the basis of the number of revolutions of a motor and an accelerator signal and performs a regenerative braking according to the state of deceleration. The regenerative braking system includes a revolution sensor for detecting the number of revolutions of a rotor of a vehicle driving motor and an accelerator opening sensor in a RAM stores discrimination data for discriminating between a regenerative braking mode and a drive mode on the basis of the number of revolutions of the rotor and the accelerator opening and also stores on-off duty ratio data of FETs in the regenerative braking mode and that in the drive mode. A CPU retrieves on-off duty ratio data corresponding to the number of revolutions of the rotor and the accelerator opening in the regenerative braking mode when the regenerative braking mode is determined on the basis of the rotor revolutions and the accelerator opening, and controls the FETs at an on-off duty ratio corresponding to the retrieved on-off duty ratio data. The power unit for the motor vehicle is an electric motor mounted in unit cases using at least a portion of the unit cases as a motor case. In the power unit of such construction, a heat sink is attached to the motor case. Switching elements are provided for controlling an electric current to be supplied to the electric motor. The switching elements are mounted to the heat sink.

3 Claims, 29 Drawing Sheets

POWER UNIT FOR MOTOR VEHICLES

This application is a divisional of application Ser. No. 07/939,702, filed on Sep. 2, 1992, now U.S. Pat. No. 5,406,154, the entire contents of which are hereby incorporated by reference.

BACKGROUND OF THE INVENTION

1. Field of the Invention

The present invention relates to a regenerative braking system in a motor vehicle, particularly a regenerative braking system in a motor vehicle for performing a regenerative braking in accordance with a state of deceleration which has been judged on the basis of the number of revolutions of a motor and an accelerator signal. In addition, the present invention is directed to a power unit suitable for providing power thereto.

2. Description of Background Art

In a motor vehicle, as is well known, electric power is supplied from a battery to a vehicle driving motor mounted on the vehicle, thereby imparting movement to the vehicle. In such a motor vehicle, when the vehicle is to be braked, a regenerative braking is performed and the kinetic energy of the vehicle is recovered as electric power to charge the battery.

On the other hand, for imparting a function corresponding to an engine brake to an automobile using an internal combustion engine, there has been proposed a method (Japanese Patent Publication No. 12446/77) in which, when the accelerator signal level decreases, a differential value thereof is taken and switching is made into a regenerative braking state during a period corresponding to the said differential value, thereby maintaining the motor vehicle in a braked condition during that period.

In addition, a motor vehicle is also well known, wherein an output of an electric motor serves as a power source which is transmitted to a wheel to drive the wheel, thereby causing the vehicle to impart motion thereto. Motor vehicles of this type are known as described in Japanese Patent Laid Open No. 38043/79 and Utility Model Laid Open No. 80848/76.

In the above motor vehicles, particularly motor-driven two-wheeled vehicles, it is absolutely necessary to provide a power unit which is a combination of an electric motor and a power transmission mechanism. The present inventors have also proposed a power unit for motor vehicles suitable for two-wheeled vehicles as set forth in Japanese Patent Application No. 181496/89, filed in the Japanese Patent Office on Jul. 13, 1989.

According to the construction of the power unit for motor vehicles as previously set forth, a power transmission mechanism such as a stepless transmission is enclosed in a unit case, and a motor case of an electric motor is connected to the unit case using bolts or the like. A rotating shaft of the electric motor is connected to the stepless transmission. Further, a drive circuit connected by wiring to the electric motor is provided in the vehicle body for example to supply electric power to the motor.

SUMMARY AND OBJECTS OF THE PRESENT INVENTION

According to the above conventional regenerative braking method, however, there is a problem such that when the accelerator signal level is returned to zero while the vehicle is running at high speed, a regenerative braking is exerted only during the period corresponding to the differential value of the accelerator signal, and after the lapse of that period, the regenerative braking is no longer exerted despite the high-speed running of the vehicle and Zero level of the accelerator signal.

Another problem is that a smooth shift to regenerative braking is not attained because a drive mode and a regenerative braking mode are switched over from one to the other in an on-off manner with the period corresponding to the foregoing differential value as a turning point.

The present invention overcomes the above-mentioned problems. It is the object of the invention to provide a regenerative braking system in a motor vehicle wherein a state of deceleration is judged on the basis of the number of revolutions of a motor and an accelerator signal. The strength of regenerative braking is controlled according to the state of deceleration thus judged, thereby allowing a regenerative braking to be exerted even during high-speed running of the vehicle and zero level of the accelerator signal. The switching between a regenerative braking mode and a drive mode is smooth, and a function is obtained corresponding to the engine brake in an automobile using an internal combustion engine.

Generally, in a power unit for motor vehicles, a relatively large output torque is required for an electric motor. Thus, it is necessary to supply a high electric current to the motor. Consequently, in the power unit for motor vehicles described in the foregoing example wherein a drive circuit is disposed on the vehicle body side, it is required to connect the drive circuit on the vehicle body side and the electric motor through long wiring, resulting in a drop of voltage. The measures necessary to counteract electromagnetic noise are also complicated.

The present invention overcomes the above-mentioned problems. It is an object of the invention to provide a power unit for motor vehicles which diminishes the drop in the voltage applied to an electric motor and also permits taking a simple measure against electromagnetic noise.

The regenerative braking system in a motor vehicle according to the present invention is characterized by including a revolution sensor for detecting the number of revolutions of a motor, an accelerator opening sensor, and a discriminator means for discriminating between a regenerative braking mode and a drive mode on the basis of the number of revolutions of the motor and the accelerator opening. A memory means is provided which stores data of on-off duty ratios of switching elements of an inverter in the regenerative braking mode in a corresponding relation to the number of revolutions of the motor and the accelerator opening. A control means retrieves on-off duty ratio data corresponding to the number of revolutions of the motor and the accelerator opening from the memory means when the mode judged by the discriminator means is the regenerative braking mode, and controls the switching elements at an on-off duty ratio corresponding to the retrieved on-off duty ratio data to effect regenerative braking.

A vicinity of a motor driving force zero line may be set as a discriminative boundary between the regenerative braking mode and the drive mode in the discriminator means.

According to the regenerative braking system in a motor vehicle of the present invention, once the vehicle is judged to be in the regenerative braking mode on the basis of the number of revolutions of the motor and the opening of the accelerator, on-off duty ratio data corresponding to the motor revolutions and the accelerator opening is retrieved from the memory means, and switching elements are controlled at an on-off duty ratio based on the thus-retrieved on-off duty ratio data to effect a regenerative braking.

The regenerative braking can be exerted even when the vehicle is running at high speed and the accelerator opening is zero. By minimizing the change in on-off duty ratio at the boundary between the regenerative braking mode and the drive mode in the discriminator means it is possible to effect a smooth switching from one mode to the other without creating a feeling of sudden change.

In order to achieve the above-mentioned object with regard to a drop in the voltage, a power unit for a motor vehicle is mounted in a unit case wherein at least a portion of the unit case is used as a motor case. A rotating shaft of the electric motor is connected for transmission of the power to an output shaft supported rotatably by the unit case. The power of the electric motor which is outputted from the said output shaft is transmitted to a driving wheel. A heat sink is attached to the motor case and switching elements are provided for switching an electric current to be supplied to the electric motor. The switching elements are mounted to the heat sinks to constitute a drive circuit.

According to the invention, a construction is provided wherein a cover member covers the switching elements-mounted portion of the heat sink and is mounted on the heat sink. Resin is filled between the cover member and the heat sink to fix the two to each other. The heat sink is fixed to the motor case.

The unit case is divided into the motor case and a case body in the axial direction of the rotating shaft between end portions of the same shaft. A bearing rotatably supports one end portion of the rotating shaft. A rotation sensor for detecting the rotation of the rotating shaft and the heat sink are provided in the motor case. The heat sink is disposed on one side of the bearing in the axial direction of the rotating shaft, while the rotation sensor is disposed on the other side of the bearing in the axial direction of the rotating shaft.

A stator of the electric motor is fixed to the motor case. The stator and the rotation sensor are disposed adjacent each other in the axial direction of the rotating shaft. Connecting terminals are provided on the heat sink-side face of the motor case and power supply terminals are provided on the motor case-side face of the heat sink. A plate member is disposed in a predetermined position between the motor case and the heat sink. Terminals for electrical conduction and connection between the power supply terminals of the heat sink and the connecting terminals of the motor case are provided on the plate member.

The heat sink is provided in the unit case in proximity to the electric motor and switching elements which constitute a drive circuit which are mounted to the heat sink. Thus, it is possible to shorten the wiring which connects the drive circuit and the motor, resulting in a diminished drop of voltage. Further, it is easy to take a measure to reduce electromagnetic noise. Since the switching elements are mounted to the heat sink provided in the unit case, it is not necessary to use a special support member for supporting the drive circuit. The number of parts can be decreased and a reduction of size of the device is attainable.

The switching elements-mounted portion of the heat sink is covered with resin. It is possible to protect the switching elements without impairing the cooling property and without an increase in weight.

The motor case is divided from the case body. In the case body, the heat sink is disposed together with a bearing and rotation sensor in the axial direction of the rotating shaft. It is possible to attain a further reduction of size, and the assembly can be facilitated by mounting the heat sink, etc. beforehand to the divided case.

The stator of the electric motor is also fixed to the divided case, electric parts such as the stator coil of the motor, rotation sensor and drive circuit can be mounted in a unitized form. The assembly thereof can be accomplished more easily, and it is also possible to simplify the wiring.

The motor case terminals and the heat sink terminals are rendered conductive with each other through terminals. It is not necessary to wire the terminals. The mounting of the heat sink to the motor case can be accomplished very easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

DETAILED DESCRIPTION OF THE PREFERRED EMBODIMENTS

The present invention will be described below in terms of an embodiment thereof, in which the invention is applied to a motor-driven two-wheeled vehicle.

Figure 1:
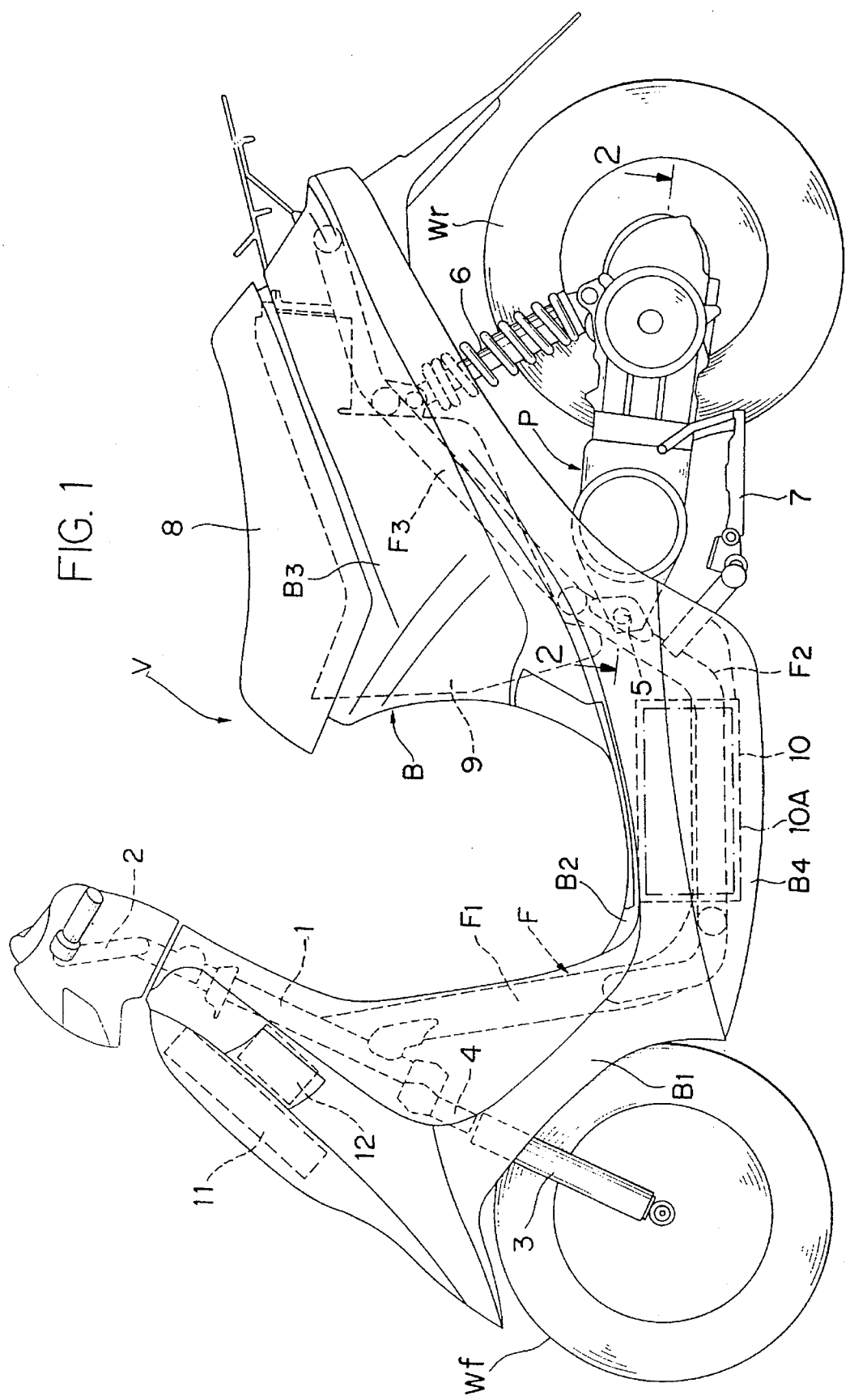
FIG. 1 is a side view of a motor-driven, two-wheeled vehicle according to an embodiment of the present invention.

FIG. 1 is a side view showing a motor-driven two-wheeled vehicle relating to the present invention. In this vehicle, a vehicle body frame F comprises a front frame $F_1$, a central frame $F_2$ and a rear frame $F_3$, each of which includes a steel pipe. The outside of the vehicle body frame F is covered with a body B made of a synthetic resin and comprising a leg shield $B_1$, a step floor $B_2$, a rear cover $B_3$ and an under cover $B_4$. A heat pipe 1 is fixed to the front frame $F_1$, and a front fork 4 is pivotally supported by the head pipe 1. The front fork 4 includes, at an upper end thereof, a steering handle 2 and supports, at the lower end thereof, a front wheel Wf through a front cushion 3 and a shaft.

The front end of a swing type power unit P is connected to the rear portion of the central frame $F_2$ as a rear fork vertically pivotably through a pivot 5. The power unit P supports a rear wheel Wr at the rear end thereof in a cantilevered manner through a shaft, and the upper surface of its rear portion and the rear frame $F_3$ are connected together through a rear cushion 6.

A stand 7 mounted to the central frame $F_2$ covers the underside of the front portion of the power unit P, in a stowed position of the stand, as illustrated in FIG. 1. The stand 7 serves as a protective member for a later-described driving motor contained in the power unit. A receptacle portion 9 which is opened and closed by a seat 8 is provided above the power unit P. The seat 8 is supported in a vertically pivotably manner by the vehicle body.

The receptacle portion 9 is formed of a magnetic shielding material such as an electroconductive resin to prevent articles contained in the receptacle portion, e.g. floppy disk, from being influenced by the magnetism generated from the motor.

A battery box 10 which houses a battery 10A as a power source for driving the motor is provided on the central frame $F_2$. A controller 11 for controlling the operation of the motor and a charger 12 for charging the battery 10A are provided in front of the head pipe 1.

Figure 2:
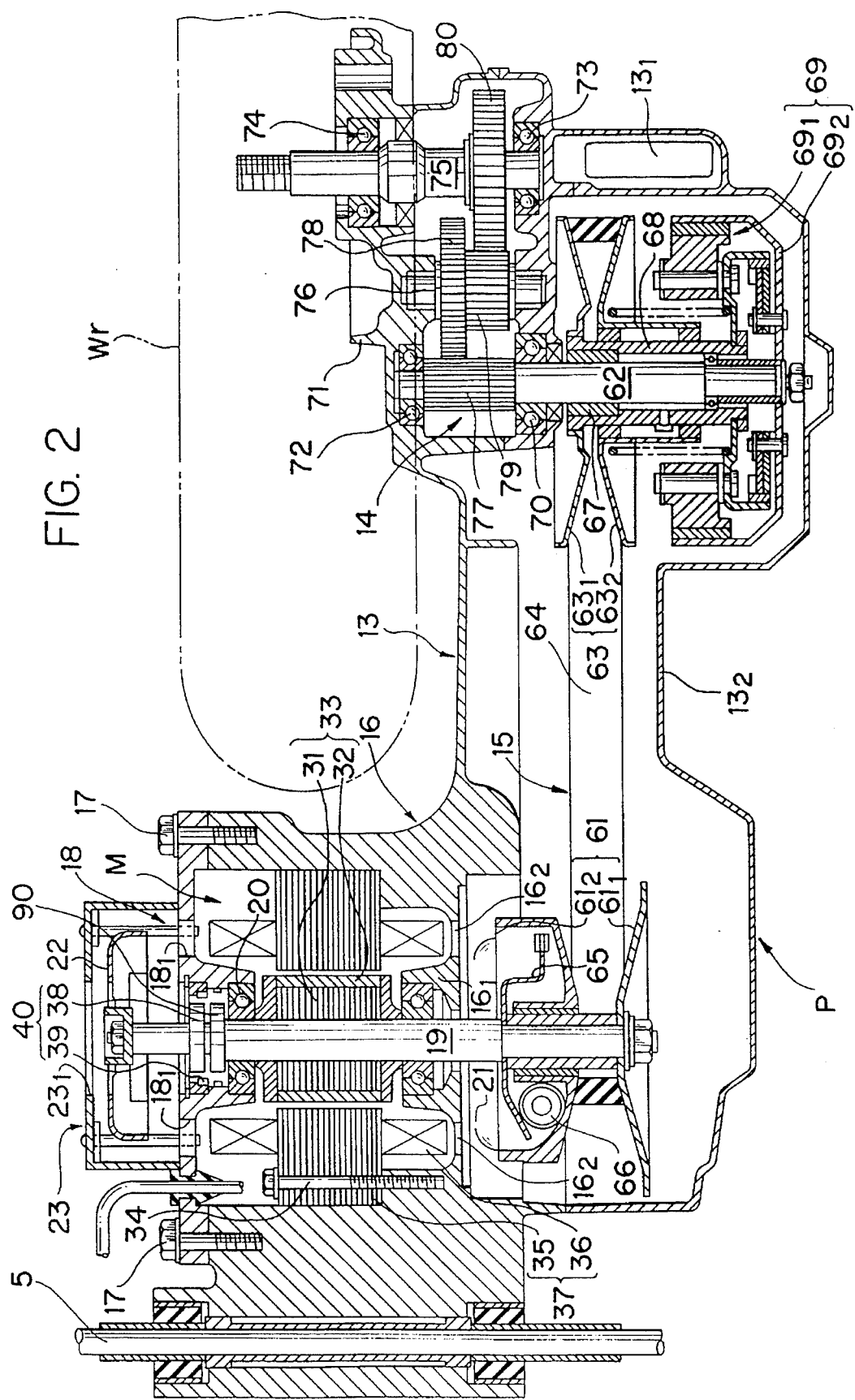
FIG. 2 is a sectional view taken on line 2—2 in FIG. 1.

Referring to FIG. 2, the power unit P includes a transmission case 13 through the front end of which the pivot 5 extends in the transverse direction. A motor M disposed in the front portion of the case 13 and a decelerator 14 disposed in the rear portion of the case are connected together through a belt type stepless transmission 15.

The motor M is accommodated in the interior of a motor housing 16 which is integral with the front portion of the transmission case 13, and an opening formed in the right side face of the motor housing 16 is closed with a cover member 18 fixed with bolts 17. A rotating shaft 19 of the motor M is supported by both a bearing 20 provided in the cover member 18 and a ball bearing 21 provided in a left-end wall portion $16_1$ of the motor housing 16.

A cooling fan 22 is mounted to the rightmost end of the rotating shaft 19 projecting from the cover member 18, and the outer periphery thereof is covered with a fan cover 23 having an air intake port $23_1$. The air introduced from the air intake port $23_1$ by the cooling fan 22 flows into the motor housing 16 through through holes $18_1$. After cooling the motor M, the air is fed into the transmission case 13 from through holes $16_2$ formed in the wall portion $16_1$.

The air then flows backward through the interior of the transmission case 13 to cool the belt type stepless transmission 15 and is then discharged to the exterior from an exhaust port $13_1$ formed in the rear end of the case 13. The leftmost end of the rotating shaft 19 extending into the transmission case 13 through the wall portion $16_1$ of the motor housing 16 is used directly as an input shaft for the stepless transmission 15.

The motor M is a brushless DC motor, which includes a rotor 33 having a permanent magnet 32 disposed on the outer periphery of an iron core 31 fixed to the rotating shaft 19. Stator 37 comprising Y-connected coils 36U, 36V and 36W each wound around an iron core 35 is fixed to the interior of the motor housing 16. The motor M is further provided with a rotor position sensor 40 and a revolution sensor 90 for detecting the number of revolutions of the motor M, the rotor position sensor 40 includes a magnet 38 fixed onto the rotating shaft 19 and three Hall elements 39 disposed in an opposed relation to the outer periphery of the magnet 38.

The revolution sensor 90 includes a magnet fixed onto the rotating shaft 19 and a magnetism sensitive element, e.g. MR element, provide opposedly to the outer periphery of the magnet.

Figure 3:
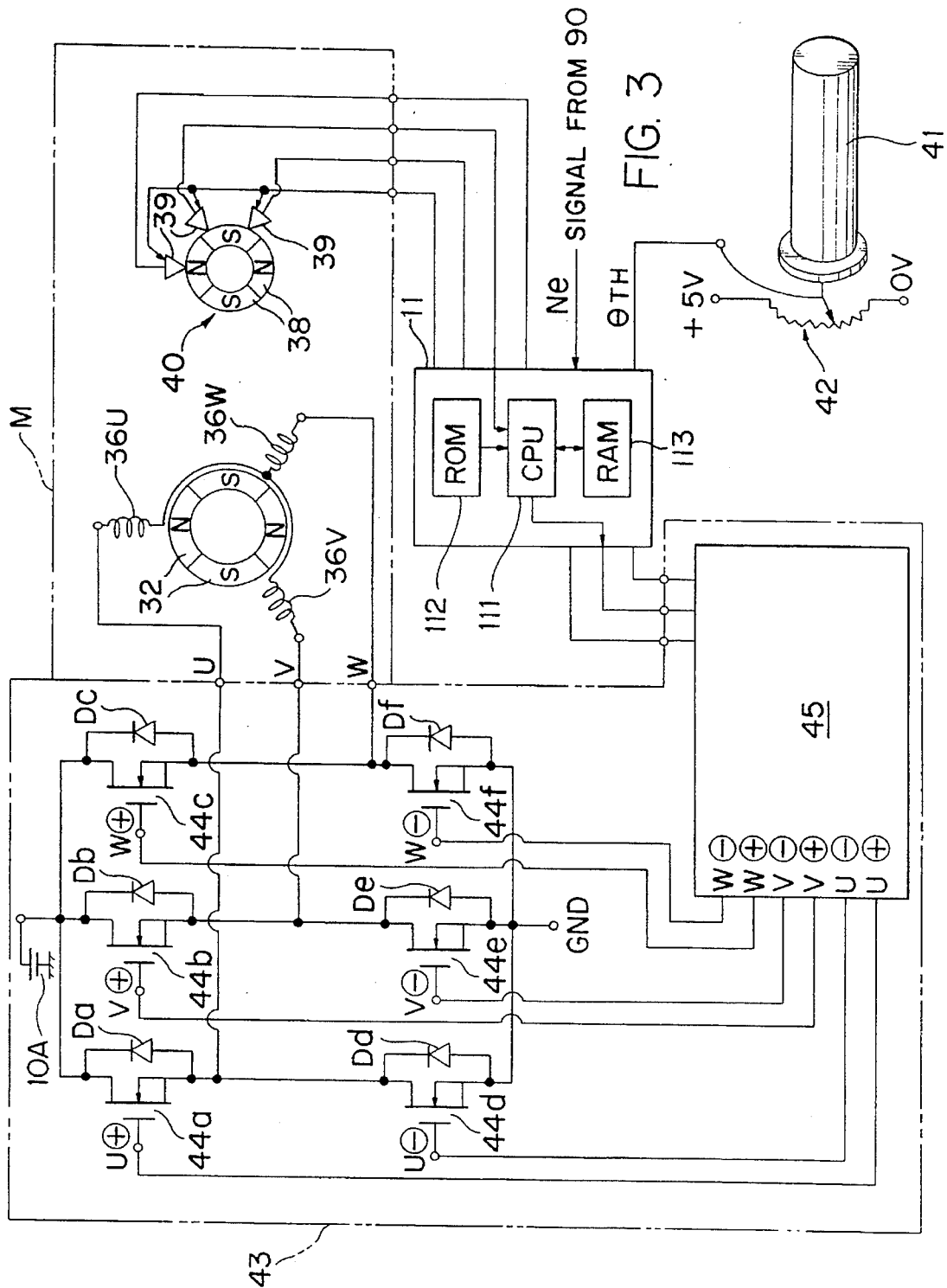
FIG. 3 is a circuit diagram showing a motor control system.
Figure 4:
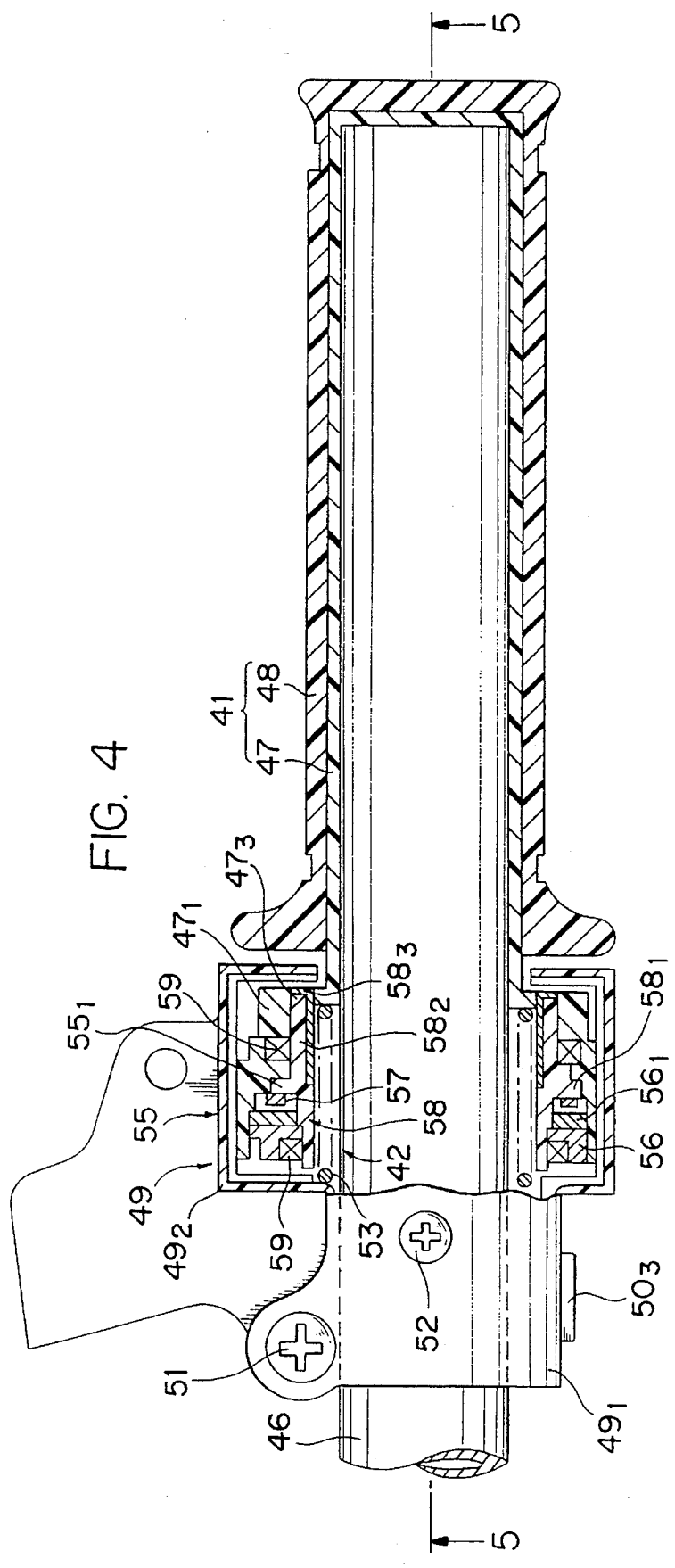
FIG. 4 is a longitudinal sectional view of an accelerator grip portion, showing the structure of an accelerator opening sensor.

FIG. 3 is a circuit diagram showing a control system for the motor M. For controlling the rotating speed of the motor M. An output potential from an accelerator opening sensor 42 generated a potentiometer for detecting a rotational angle of an accelerator grip 41 of the steering handle 2 and a phase signal of the rotor 33 detected by the rotor position sensor 40 are fed to the controller 11. An output of the revolution sensor 90 for regenerative braking of the motor M is fed to the controller 11.

A driver 43 is disposed between the controller 11 and the motor M which is controlled by the output of the controller. The driver 43 includes six field effect transistors, hereinafter referred to simply as FETs, 44a to 44f which are connected to diodes Da to Df, respectively, in parallel, and also includes a switching circuit 45 which controls the FETs 44 on the basis of on-off duty ratio data stored in a ROM 112 to make successive switching of the electric current flowing in the stator 37 of the motor M. The controller 11, FETs 44a to 44f and switching circuit 45 together constitute an inverter.

Figure 11:
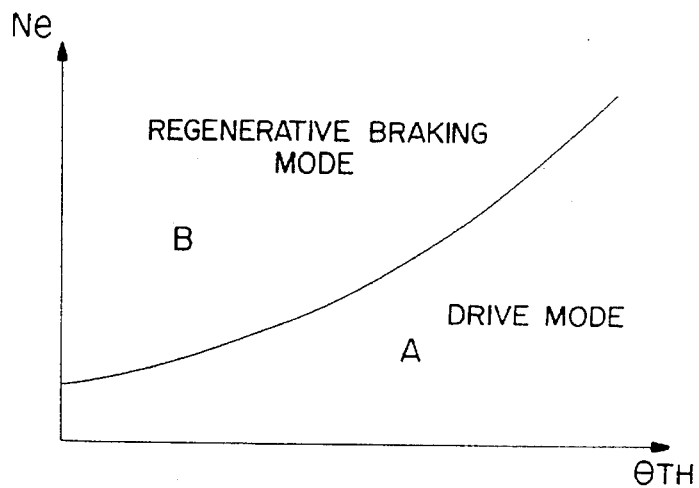
FIG. 11 is a schematic diagram showing a mode discrimination table used in the embodiment of the present invention.
Figure 12:
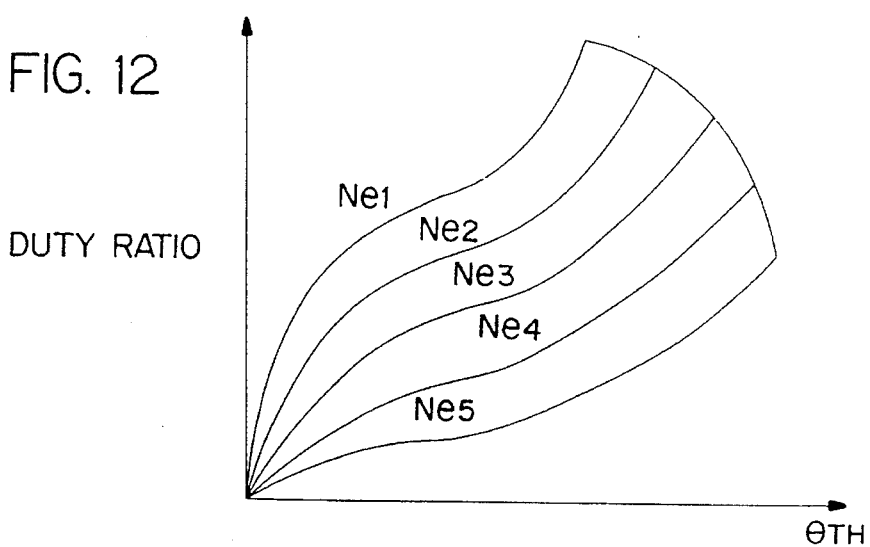
FIG. 12 is a schematic diagram showing a drive duty ratio table used in the embodiment of the present invention.
Figure 13:
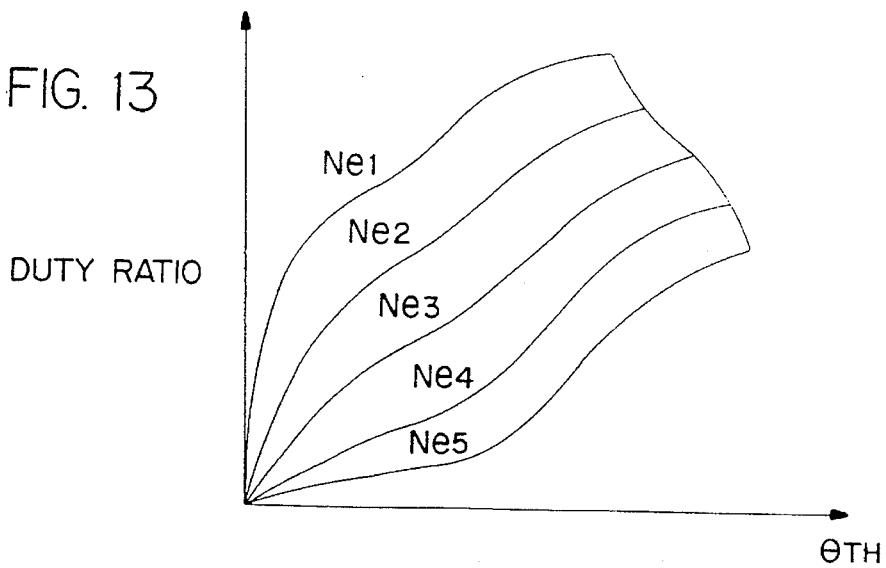
FIG. 13 is a schematic diagram showing a regenerative braking duty ratio table used in the embodiment of the present invention.

The controller 11 includes a central processing unit (CPU) 111, a ROM 112 containing programs and a RAM 113 having a work area. Further, stored in the ROM 112 are a mode discrimination table, see FIG. 11, containing mode discrimination data for discriminating between drive mode and regenerative braking mode on the basis of both an output voltage Ne of the revolution sensor 90 and an output voltage $\theta_{TH}$ of the accelerator opening sensor 42, a drive duty ratio table, see FIG. 12, containing drive duty data based on the output voltages Ne and $\theta_{TH}$.

A mode discrimination is made with reference to the mode discrimination table and on the basis of the output voltages Ne and $\theta_{TH}$. When the result of the discrimination is the drive mode, a drive duty ratio is read out with reference to the drive duty ratio table, while in the regenerative braking mode, a regenerative braking duty ratio is read out with reference to the regenerative braking duty ratio table.

As shown in FIGS. 4 to 9, an accelerator grip 41 includes a generally cylindrical rotary bracket 47 and a grip body 48 integrally fitted on the outer periphery of the bracket 47 which is supported rotatable at a front end of a right-hand handle pipe 46 of the steering handle 2.

As illustrated in FIGS. 4–9, a vertically bisected upper cover 49 and lower cover 50 are mounted near a base portion of the accelerator grip 41 of the handle pipe 46. The covers 49 and 50 each comprise a mounting portion $49_1$ ($50_1$) of a small diameter supported on the handle pipe 46 and a receptacle portion $49_2$ ($50_2$) which covers the accelerator opening sensor 42. A lug $50_3$ of the lower cover 50 is brought into engagement with an opening $49_3$ formed in the mounting portion $49_1$ of the upper cover 49 and in this state both covers 49 and 50 are integrally connected together through a bolt 51, then fixed to the handle pipe 46 with another bolt 52.

A flange $47_1$ formed at a base portion of the rotary bracket 47 of the accelerator grip 41 extends into the receptacle portions $49_2$ and $50_2$ of both covers 49 and 50 and is retained to one end of a torsion spring 53 wound around the outer periphery of the handle pipe 46. As a result, the accelerator grip 41 is urged in the direction of arrow a toward a no-load position in which a stopper face $47_2$ of the flange $47_1$ comes into abutment with a stopper face $82_1$ of an actuating member 82 for a brake switch 81 provided in the lower cover 50, see FIG. 8.

The actuating member 82 is urged in a direction opposed to the biasing force of the torsional spring 53 by means of a spring 83 which is stronger than the spring 53. In a released state of the accelerator grip 41, the flange $47_1$ and the actuating member 82 stop in the illustrated positions. At this time, an electric conductor $82_2$ mounted to the actuating member 82 is in its illustrated position spaced from a pair of contacts $84_1$ and $84_2$, and the brake switch 81 is off. When the accelerator grip 41 is further rotated in the direction of arrow a beyond the no-load position against the biasing force of the spring 83 the stopper face $82_1$ is pushed and so the actuating member 82 moves down, whereby the contacts $84_1$ and $84_2$ are rendered conductive with each other through the electric conductor $82_2$ to actuate the brake switch 81. Appropriate load and rotational angle for turning on the brake switch 81 are, for example 10 kgf/cm and 4°, respectively.

A generally annular, fixed housing 55 fixed with bolt 54 to the underside of the lower cover 50 is disposed within the receptacle portions $49_2$ and $50_2$ of both covers 49 and 50 so as to surround the outer periphery of the handle pipe 46. A printed circuit board 56, is integrally provided in the interior of the fixed housing 55 on one side of the printed circuit board 56. A resistor $56_1$ and an electric conductor $56_2$ are printed.

A brush 57 is provided in the interior of the fixed housing 55 having two contacts $57_1$ and $57_2$ which are in sliding contact with the printed circuit board 56. A rotatable housing 58 is also disposed therein and includes an inner periphery partially reinforced with cylindrical metal pieces $58_3$. Both housings 55 and 58 are coupled together to permit a relative rotation through a pair of seal members 59 and not to permit axial movement by engagement of an annular lug $58_1$ of the rotatable housing 58 with an annular slot $55_1$ formed in the fixed housing 55.

Two engaging lugs $58_2$ formed axially on the rotatable housing 58 are loosely fitted through a slight gap into engaging holes $47_3$ formed in two positions in the flange $47_1$ of the rotary bracket 47, whereby an axial play of the accelerator grip 41 is prevented from being transferred to the rotatable housing 58 while the rotation of the grip 41 is transmitted to the rotatable housing 58.

Figure 10:
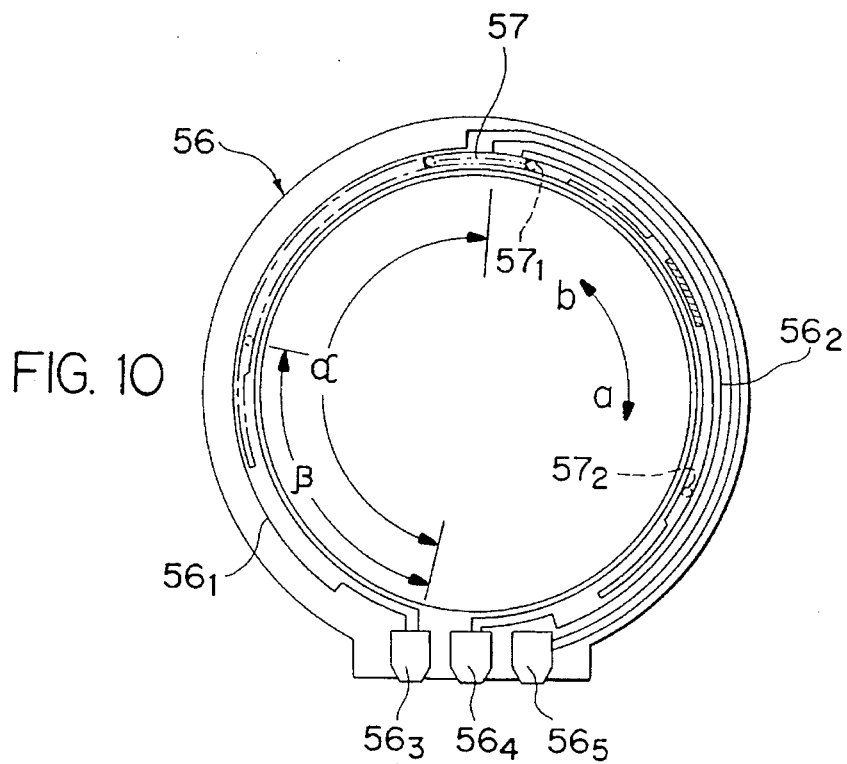
FIG. 10 is a partially enlarged view of FIG. 9.

As is apparent also from reference to FIG. 10, the brush 57 opposed to the printed circuit board 56 is formed in an arcuate shape having a central angle of about 15°. The left half of the resistor $56_1$, which is substantially circular, and the whole of the electric conductor $56_2$, which is substantially semi-circular, both printed on the board 56, are disposed along a moving path of the brush 57.

Figure 8:
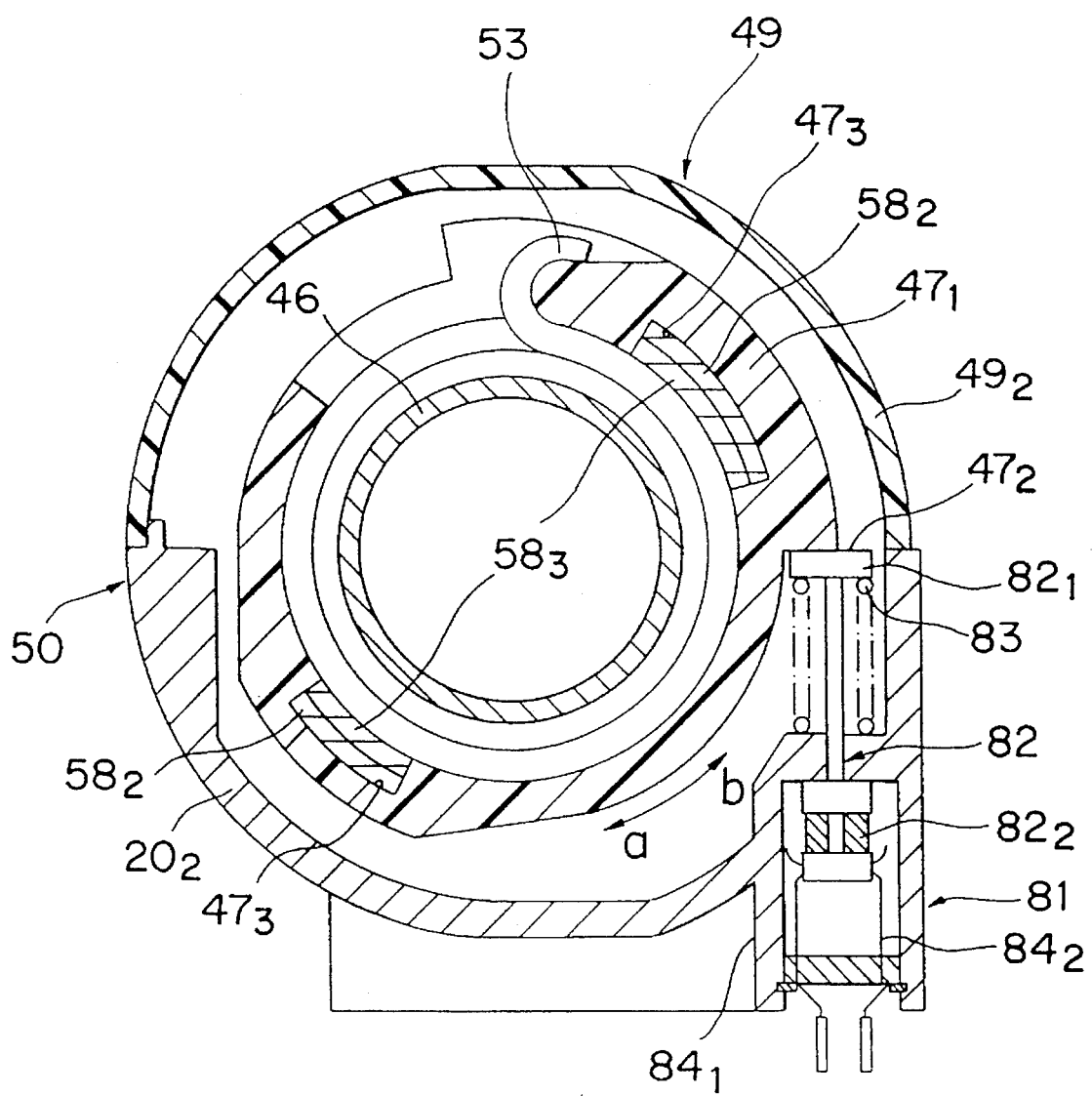
FIG. 8 is a sectional view taken on line 8—8 in FIG. 5.
Figure 9:
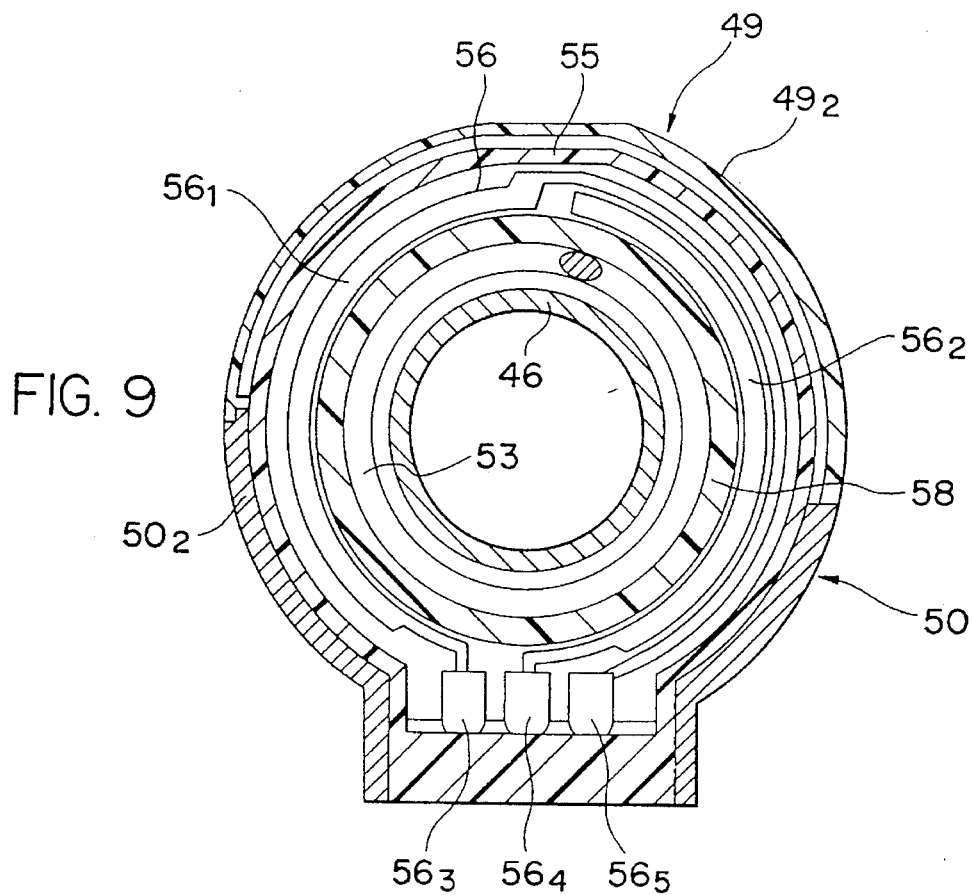
FIG. 9 is a sectional view taken on line 9—9 in FIG. 5.

When the accelerator grip 41 has been turned forward by the biasing force of the torsion spring 53 and now assumes the no-load positions, that is, when a stopper face $47_2$ of the rotary bracket 47 is in abutment with a stopper face $50_4$ of the lower cover 50 in FIG. 8, the brush 57 is in its solid line position in FIG. 10 and its two contacts $57_1$ and $57_2$ are both in contact with the electric conductor $56_2$. In this way, the conduction between the resistor $56_1$ and the electric conductor $56_2$ is cut off and the value of electric resistance between terminals $56_3$ and $56_4$ become infinite.

When the accelerator grip 41 is turned toward this side, namely, in the direction of arrow b in FIGS. 8 and 10, against the torsion spring 53, the contact $57_1$ comes into contact with an end portion of the resistor $56_1$ and the electric resistance between the terminals $56_3$ and $56_4$ increases, including the greater part, indicated at α, of the left half of the resistor $56_1$.

With further rotation of the accelerator grip 41, the brush 57 moves to a full load position indicated by a chain line in FIG. 10 and the electric resistance between the terminals $56_3$ and $56_4$ decreases, including only a lower portion β of the left half of the resistor $56_1$.

For example, a voltage of 0V to 5V is outputted between both terminals $56_3$ and $56_4$ correspondingly to the full load position from the no-load position.

Figure 5:
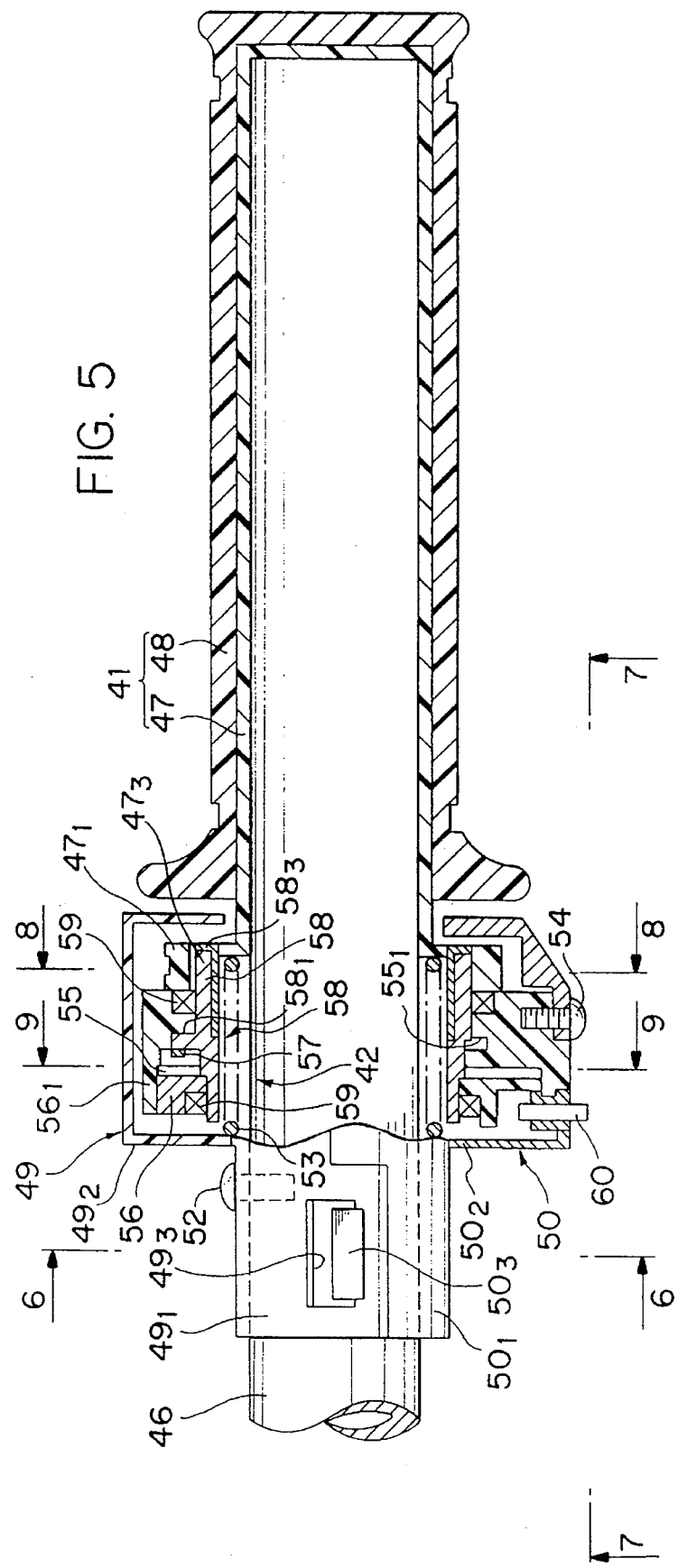
FIG. 5 is a sectional view taken on line 5—5 in FIG. 4.
Figure 6:
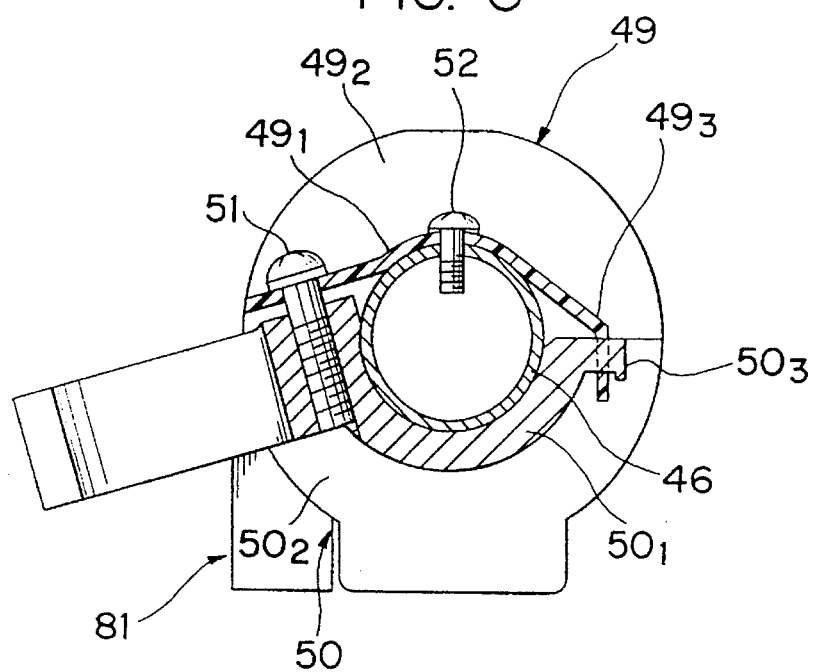
FIG. 6 is a sectional view taken on line 6—6 in FIG. 5.
Figure 7:
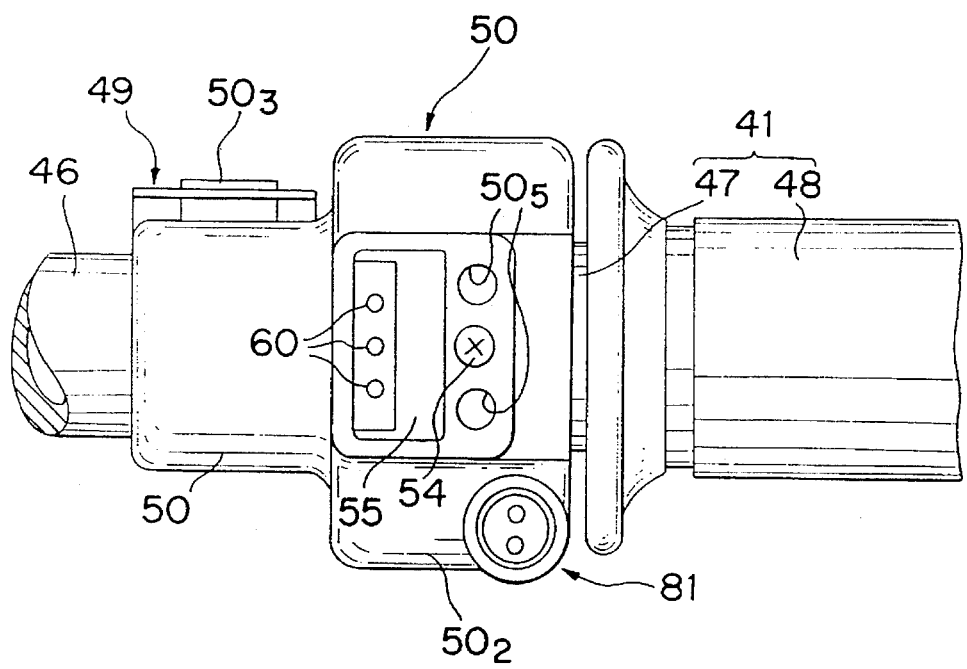
FIG. 7 is a view as seen in the direction of arrows 7—7 in FIG. 5.

As illustrated in FIGS. 7 and 5, drain holes $50_5$ are provided together with lead wire 60 for connection to terminals $56_3$ and $56_5$.

Referring again to FIG. 2, the structure of the belt type stepless transmission 15 which is accommodated in the interior of the transmission case 13 will now be described. The belt type stepless transmission 15 is provided with a driving pulley 61 mounted on the rotating shaft 19 which is projecting into the transmission case 13 from the motor housing 16 side, and also provided with a driven pulley 63 mounted on a decelerator input shaft 62 supported in the rear portion of the case 13. An endless belt 64 is entrained about both pulleys 61 and 63.

The driving pulley 61 comprises a stationary-side pulley half $61_1$ fixed to the rotating shaft 19 and a movable-side pulley half $61_2$ supported axially slidably by the rotating shaft 19. Further, a centrifugal weight 66 is radially movable and disposed between the movable-side pulley half $61_2$ and a ramp plate 65 fixed to the rotating shaft 19.

The driven pulley 63 comprises a stationary-side pulley half $63_1$ supported by a collar 68 which is fitted on the decelerator input shaft 62 so as to be rotatable relatively through a needle bearing 67, and a movable-side pulley half $63_2$. A driving force transmitted to the driven pulley 63 is transferred to the decelerator input shaft 62 through an automatic centrifugal clutch 69. A side face of the transmission case 13 houses therein the belt type stepless transmission 15 and the automatic centrifugal clutch 69. The transmission case 13 is closed with a side cover $13_2$. The automatic centrifugal clutch 69 is composed of a first clutch $69_1$ for transmitting the rotation of the motor M to the rear wheel Wr during normal vehicular running, that is, for transmitting the rotation of the driven pulley 63 to the decelerator input shaft 62, and a second clutch $69_2$ for transmitting the rotation of the rear wheel Wr to the motor M to obtain an engine brake effect, that is, for k transmitting the rotation of the decelerator input shaft 62 to the driven pulley 63.

The decelerator input shaft 62 is supported by both a ball bearing 70 provided in the transmission case 13 and a ball bearing 72 provided in a decelerator cover 71. An intermediate shaft 76 is supported between the decelerator input shaft 62 and an axle 75 of the rear wheel Wr which is supported by a pair of ball bearings 73 and 74 provided in the case 13 and the decelerator input shaft 62 is transmitted to an output gear 80 mounted on the axle 75 through two intermediate gears 78 and 79 mounted on the intermediate shaft 76.

The following description is now provided about the operation of this embodiment having the above construction.

When the accelerator grip 41 is turned to the side from the no-load position to start the operation of the motor M, the first clutch $69_1$ of the automatic centrifugal clutch 69 is engaged and the driving force of the motor M is transmitted to the rear wheel Wr. At this time, the reduction ratio of the belt type stepless transmission is at a maximum. However, with increase in the rotating speed of the motor M, the centrifugal weight 66 moves radially outwards along the ramp plate 65 fixed to the rotating shaft 19 of the motor, thereby causing the movable-side pulley half $61_2$ of the driving pulley 61 to move in a direction of approaching the stationary-side pulley half $61_1$.

As a result of this movement, an effective radius of the driving pulley 61 increases and at the same time the movable-side pulley half $63_2$ of the driven pulley 63 is driven in a direction away from the stationary-side pulley half $63_1$ through the endless belt 64, resulting in a decrease of its effective radius. Consequently, the reduction ratio of the belt type stepless transmission 15 decreases and the rotating speed of the rear wheel Wr increases, whereby the vehicle is accelerated.

Figure 15:
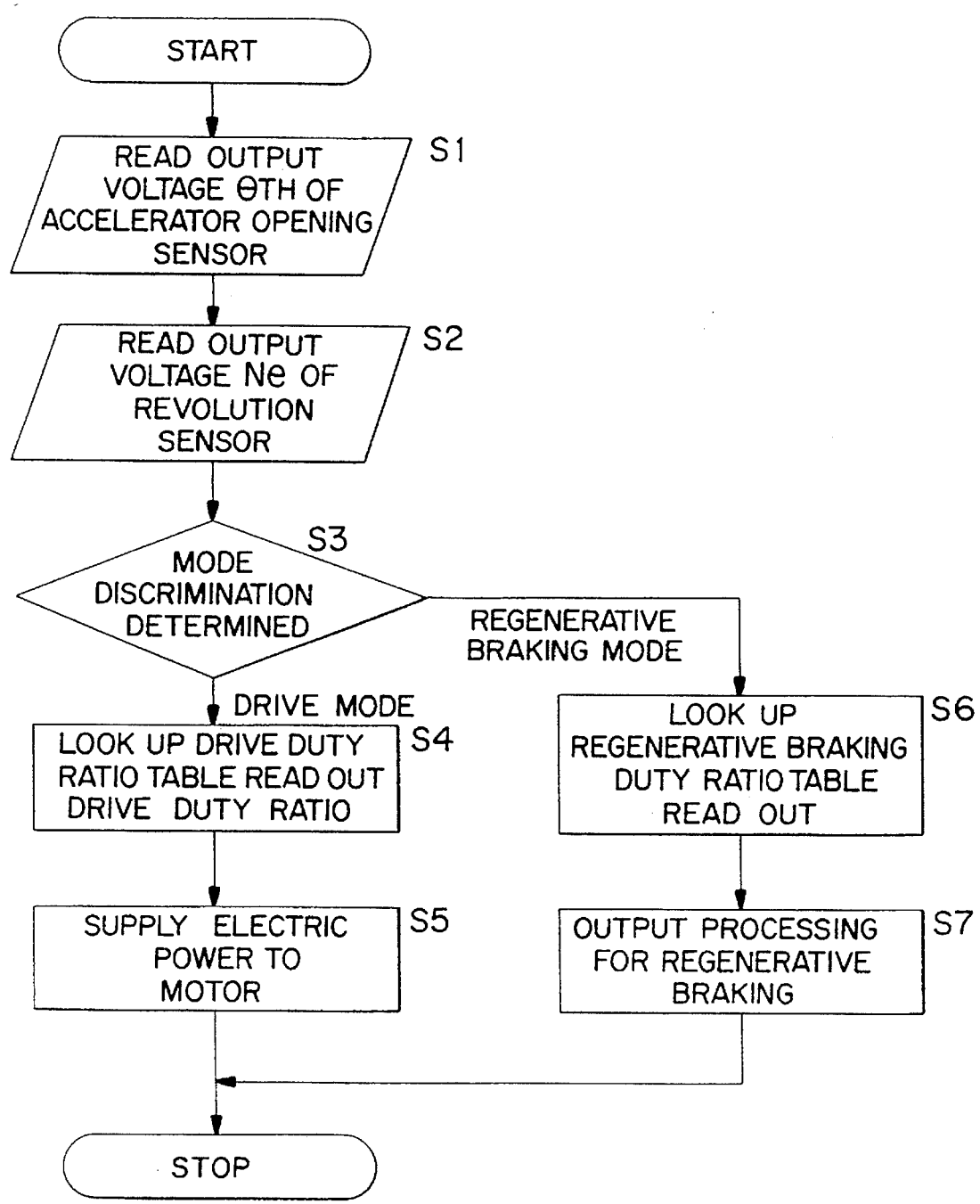
FIG. 15 is a flowchart showing the operation of the embodiment of the present invention.

By operating the accelerator grip 41 between the no-load position and the full load position, following the start-up of the motor-driven two-wheeled vehicle, as shown in the flowchart of FIG. 15, an output voltage $\theta_{TH}$ of the accelerator opening sensor 42 and an output voltage Ne of the revolution sensor 90 are read in steps S1 and S2. After step S2, the mode discrimination table is referred to and there is made #m a mode discrimination on the basis of the thus-read output voltages $\theta_{TH}$ and Ne, step S3. In step S3, if the output voltage $\theta_{TH}$ and Ne fall under the region A in FIG. 11, it is judged that the vehicle is in the drive mode. If the output voltage $\theta_{TH}$ and Ne fall under the region B in FIG. 11, it is judged that the vehicle is in the regenerative braking mode.

If the result of discrimination in step S3 is the drive mode, the drive duty ratio table is referred to and a drive duty ratio is read out on the basis of the output voltage $\theta_{TH}$ with the output voltage Ne as a parameter, step S4. The FETs 44a to 44f are on-off controlled through the switching circuit 45 at a duty ratio based on the drive duty ratio read out in step S4, whereby electric power is supplied to the motor M to rotate the motor, step S5. As a result, the vehicle speed is controlled.

If it is judged in step S3 that the vehicle is in the regenerative braking mode, the regenerative braking duty ratio table is referred to, following step S3, and a regenerative braking duty ratio is read out on the basis of the output voltage $\theta_{TH}$ with the output voltage Ne as a parameter, step S6. The FETs 44a to 44f are on-off controlled through the switching circuit 45 at a duty ratio based on the regenerative braking duty ratio read out in step S6 and there is performed an output processing for regenerative braking, step S7.

In the output processing for regenerative braking, the duty ratio of driving pulses for the FETs 44a to 44c is set to 0, while that of driving pulses for the FETs 44d to 44f is set to the regenerative braking duty ratio. As a result, the FETs 44a to 44c are turned off, while the FETs 44d to 44f are on-off controlled according to the regenerative braking duty ratio, and an electromotive force generated in the motor M is applied to the battery 10A, which is charged thereby.

The said charging will now be explained, for example, with respect to a voltage induced in the coils 36U and 36V. When the voltage of the battery 10A is lower than such induced voltage, an electric current based on this induced voltage flows through coil 36U, diode Da, battery 10A, diode De and coil 36V to effect the charging. On the other hand, when the voltage of the battery 10A is higher, an electric current based on the voltage induced in the coils 36U and 36V flows through coil 36U, FET 44d, diode De and coil 36V and is dissipated as heat.

Figure 14:
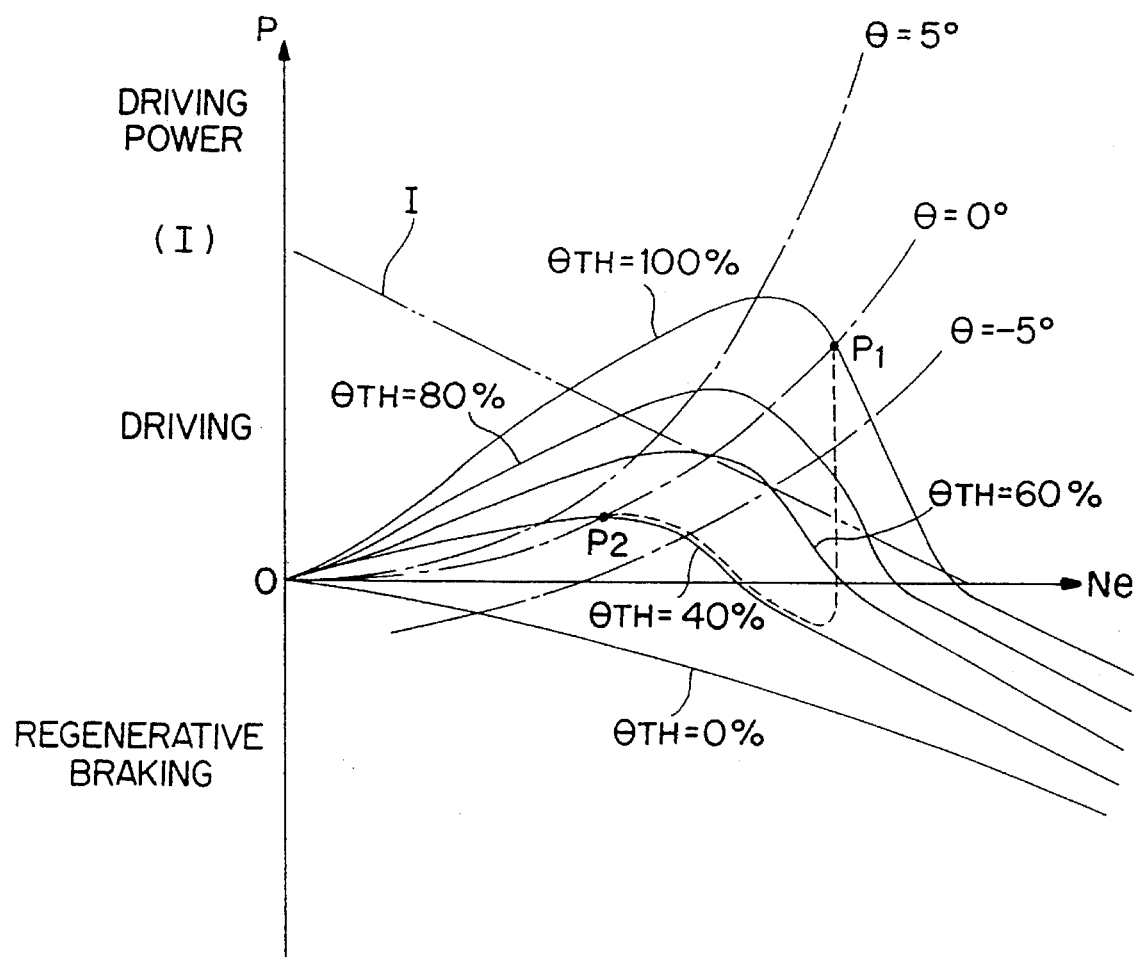
FIG. 14 is a characteristic diagram showing a relation between accelerator opening and power in the embodiment of the present invention.

It is desirable to minimize the change in on-off duty ratio at the boundary between the regenerative braking mode and the drive mode in the mode discrimination table. FIG. 14 illustrates powers proportional to the output voltages and $\theta_{TH}$, in which the thick line indicates power zero. The boundary between the regenerative driving mode and the drive mode in the mode discrimination table is set near the zero of driving force.

By so setting, even in the case where the drive mode and the regenerative braking mode are switched over from one to the other, there will be little change in the on-off duty ratio, thus permitting smooth switching, without creating any abrupt feeling of change. As a result, the motor-driven two-wheeled vehicle is braked with a deceleration torque proportional to the regenerative duty ratio and the rotating speed of the motor M.

In FIG. 14, the mark θ represents a running resistance, for example, an angle of a sloping road.

Reference is here made to the case where during vehicular running at an accelerator opening of output voltage $\theta_{TH}$=40% (drive power $P_1$), in a running resistance of θ=0, the accelerator grip 41 is operated and moved up to an accelerator opening of output voltage $\theta_{TH}$=40%. As indicated by a thick broken line in FIG. 14, the driver power $P_1$ once passes the power zero line and drops, then changes to a drive power $P_2$ along the line of $\theta_{TH}$=40%. In this case, the period from the drive power $P_1$ to the drive power equals zero is judged to be the drive mode and the FETs 44a to 44f are on-off controlled at a duty ratio based on the drive duty ratio table to drive the motor M.

The period in which the drive power is below zero is judged to be the regenerative braking mode. In this case, the FETs 44a to 44F are on-off controlled at a duty ratio based on the regenerative duty ratio table and there is performed a regenerative braking processing. Further, the period in which the drive power exceeds zero and again becomes positive into $P_2$, the vehicle is judged to be in the drive mode and there is performed a drive control processing accordance with the drive duty ratio table.

When the value of an electric current, I, flowing in the motor M is zero, the drive power is zero, so the boundary between the drive mode and the regenerative braking mode may be set near zero in terms of the value of electric current flowing in the motor M.

When the rider grips and operates the accelerator grip 41, the grip which is mounted rotatably on the front end of the handle pipe 46 moves slightly in the axial direction due to a play thereof. At this time, the flange $47_1$ formed on the rotary bracket 47 of the accelerator grip 41 also moves axially in the receptacle portions $49_2$ and $50_2$ of the upper and lower covers 49 and 50, but the play of the accelerator grip 41 will never be transferred to the rotatable housing 58 because the flange $47_1$ and the rotatable housing 58 are engaged with each other so as to be movable relatively through the engaging holes $47_3$ and engaging lugs $58_2$ and further because the rotatable housing 58 is engaged with the fixed housing 55 so as not to be movable axially through the annular lug $58_1$ and the annular slot $55_1$.

As a result, the brush 57 provided in the rotatable housing 58 comes into sliding contact at a stable face pressure with the printed circuit board 56 provided in the fixed housing 55, whereby a rotational angle of the accelerator grip 41 is accurately detected.

Such a regenerative braking of the motor M as mentioned above is advantageous in that the kinetic energy of the vehicle body can be converted to electric energy because the motor M functions as a generator. Therefore, by utilizing this electric energy in charging the battery, it is possible to attain a reduction in the size of the battery.

Although in the above embodiment the present invention was applied to a motor-driven two-wheeled vehicle, it is also applicable to motor-driven three- four-wheeled vehicles.

According to the present invention, as set forth hereinabove, since the vehicle is judged to be in the regenerative braking mode on the basis of the number of revolutions of the motor and the accelerator opening and the switching elements of the inverter is controlled at an on-off duty ratio proportional to the motor revolutions and the accelerator opening to effect a regenerative braking, the regenerative braking can be applied even when the vehicle is running at high speed and the accelerator openings is zero, there being fear of the regenerative braking being unapplied in such conditions. A regenerative braking can be attained corresponding to the engine brake in a vehicle using an internal combustion engine.

Moreover, by minimizing the change in on-off duty ratio at the boundary between the regenerative braking mode and the drive mode, a smooth switching between the regenerative braking mode and the drive mode can be attained without creating any abrupt feeling of change.

Further, in the case where the boundary between the regenerative braking mode and the drive mode is set near zero of the motor drive force, it is possible to smoothly make a switching from one mode to the other.

Additionally, since the degree of the regenerative braking can be adjusted by changing the accelerator opening, it is easy to control the number of revolutions of the motor.

FIGS. 16–23 illustrate a power unit for a motor vehicle according to an embodiment of the present invention.

Figure 16:
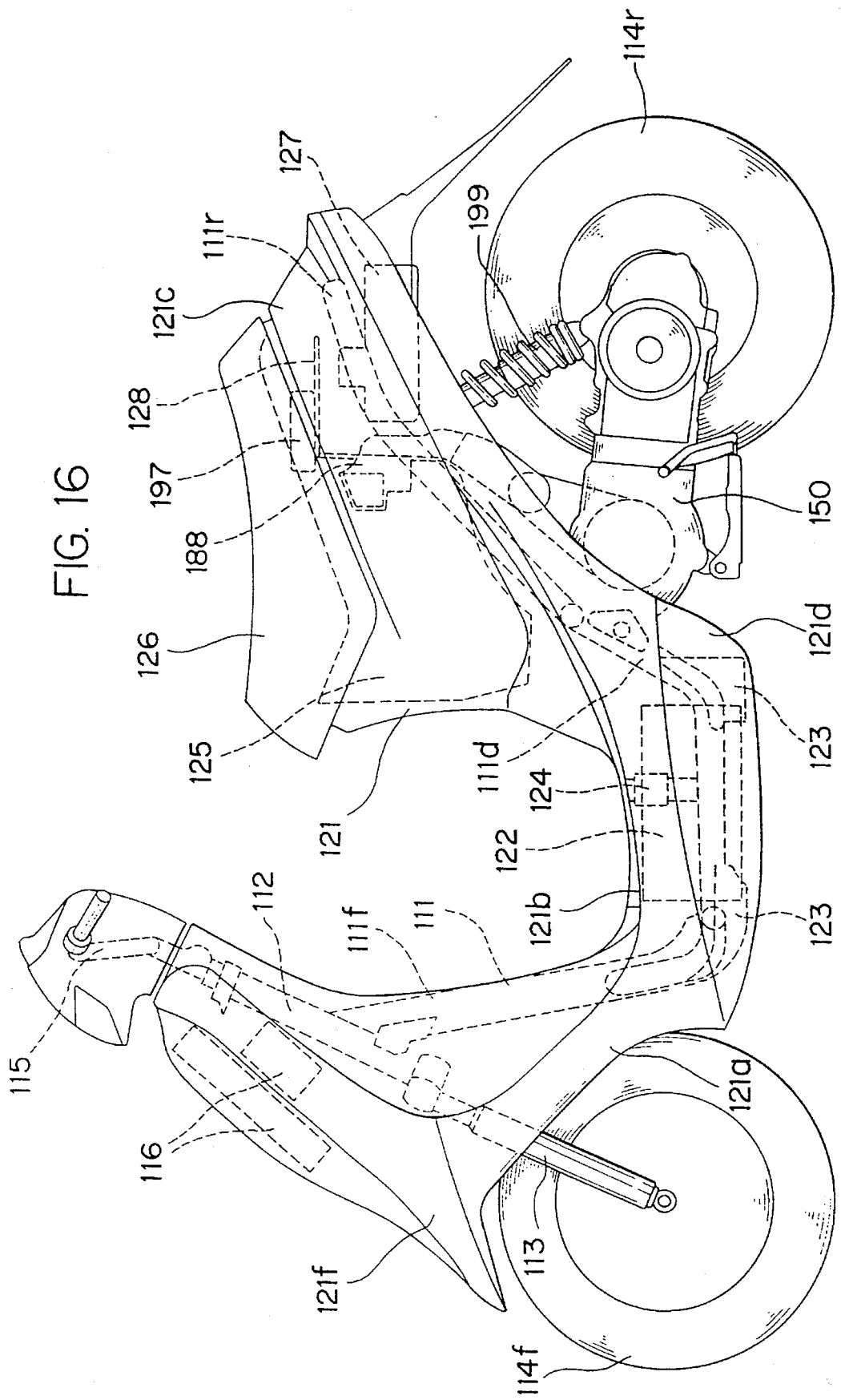
FIG. 16 is a side view of a motor-driven two-wheeled vehicle equipped with a power unit for a motor vehicle according to an embodiment of the present invention.

FIG. 16 illustrates a vehicle body frame 111 which is generally U-shaped in side view. The vehicle body frame 111 has a front frame 111f, a center frame 111d and a rear frame 111r, and it is covered with a synthetic resin body 121 which includes a front cover 121f, a leg shield 121a, a step floor 121b, a rear cover 121c and an under cover 121d.

A head tube 112 is fixed to the front portion of the front frame 111f of the vehicle body frame 111, and a front wheel 114f is supported by the head tube 112 through a front fork 113 so that it can be steered with a steering handle 115. The steering handle 115 has an accelerator grip 115a. A potentiometer 115b for detecting an operation angle of the accelerator grip 115a is attached to the steering handle 115, see FIG. 22.

A control box 116 is mounted to the front portion of the head tube 112, and the front side of the control box 116 is covered with the front cover 121f. In the interior of the control box 116 is accommodated a controller 149 comprising an ECU for example. The potentiometer 115b and a charging circuit, a drive circuit and a battery which will be described later are connected to the controller 149.

A battery box 122 is provided on the center frame 111d of the vehicle body frame 111, and a power swing unit, power unit for a motor vehicle, 150 is supported pivotably by a pivot shaft, not shown. As will be described later, the power swing unit 150 includes an electric motor 152, etc. mounted in a case 151, and it supports a rear wheel 114r rotatably at the rear end of the case 151.

A cushion unit 199 is disposed between the rear portion of the power swing unit 150 and the vehicle body frame 111.

The battery box 122 is mounted on a battery holder 123 fixed to the center frame 111d and is clamped with a band 124. A plurality of batteries are positioned within the battery box 122, see FIG. 22. The batteries 136 are connected together in parallel or in series and then connected to a later-described drive circuit and the foregoing controller 149.

Though not clearly shown in the drawings, the battery holder 123 comprises a plate-like member mounted bridgewise in the vehicle width direction below the center frame 111*d*, and the step floor 121*b* is secured through the band 124 onto the battery box 122 mounted on the battery holder 123.

Further, the rear cover 121*c* is fixed to the rear frame 111*r* of the vehicle body frame 111. The rear cover 121*c* is generally in the form of a hollow cylinder having an open upper portion. A seat 126 is supported on the top of the rear cover so that it can close the opening. The front portion of the seat 126 is mounted to the upper portion of the rear cover 121*c* using a hinge or the like. When used as a seat, a driver is permitted to sit thereon, see FIG. 16. The seat closes the opening of the rear cover 121*c*, while in a forwardly brought-down state of the seat, it allows the opening of the rear cover 121*c* to be exposed.

A trunk box 125 and a charging box 127 are positioned within the rear cover 121*c* obliquely forward and upward of the rear wheel 114*r* and in front and rear positions, respectively. The upper portion of the trunk box 125 is open and this opening is covered with the seat 126 so that it can be opened and closed. The trunk box 125 has size and capacity permitting a helmet to be received therein.

The charging box 127 is generally L-shaped in side view having an upwardly projecting front portion, and a front upper portion thereof is open. The charging box 127 houses therein a charger, etc. for charging from a commercial AC power source, and its front upper opening is closed with a lid 128 so that it can be opened and closed. On one face of the lid 128 is provided a charging circuit 197, and this charging circuit and the charger are connected to the batteries 136, etc.

In FIG. 16, an intake duct 188 is disposed within the rear cover 121*c*. One end of the intake duct 188 is connected to a cooling air inlet of the power swing unit 150 and an opposite end thereof is open into the rear cover 121*c*.

Figure 17:
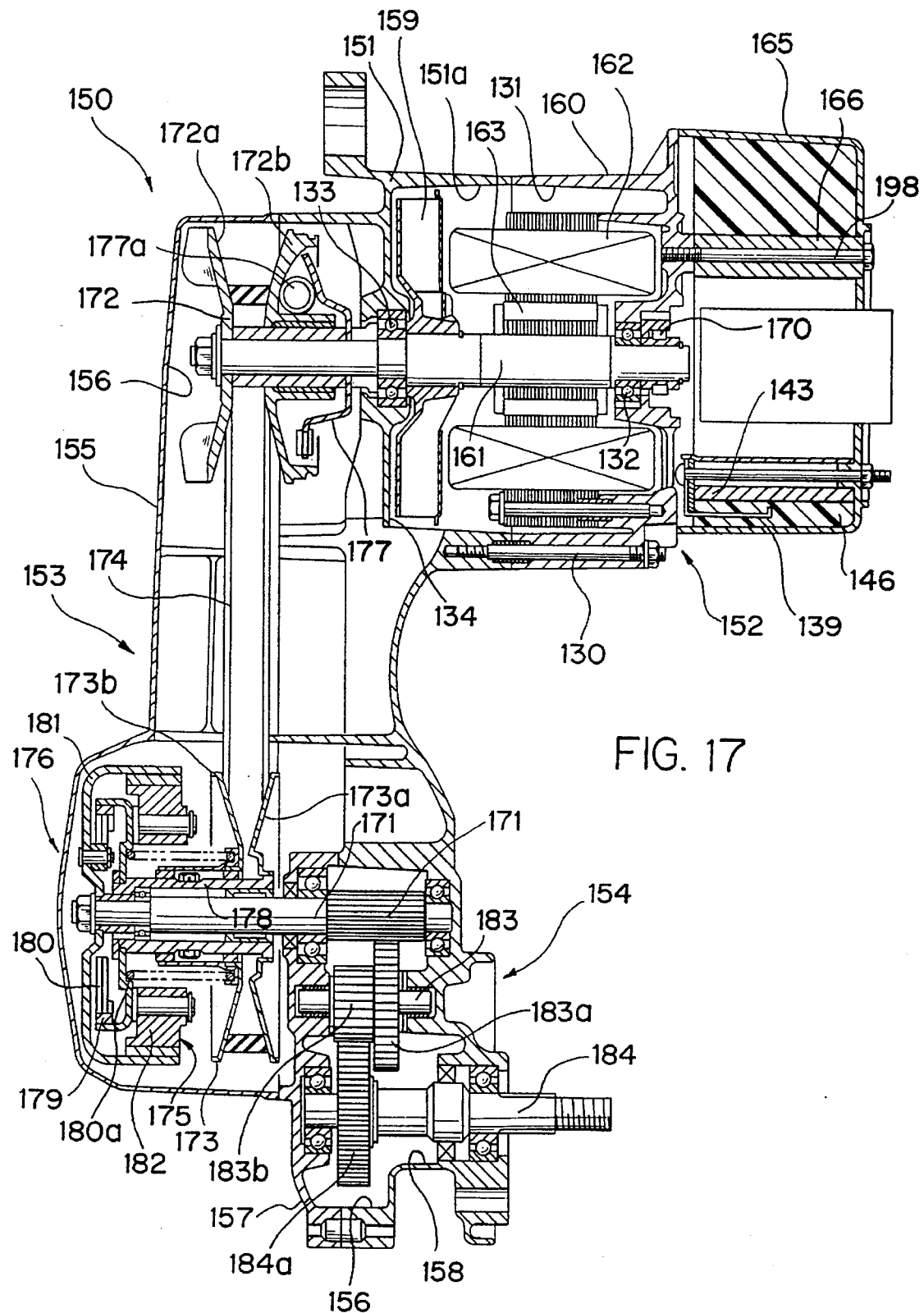
FIG. 17 is a sectional view of the power unit for a motor vehicle.
Figure 18:
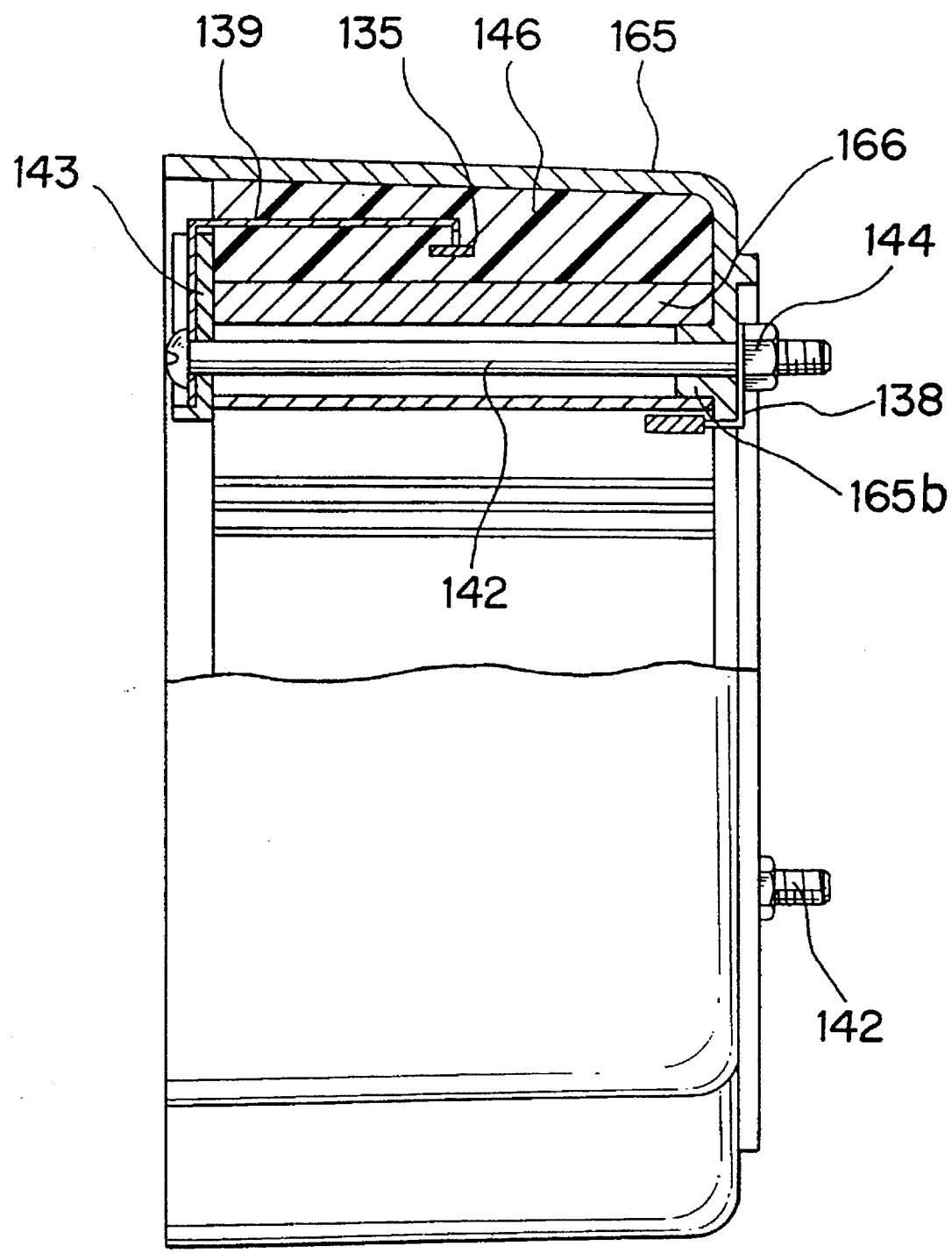
FIG. 18 is a partially cut-away sectional view showing a principal portion of the power unit for a motor vehicle.
Figure 19:
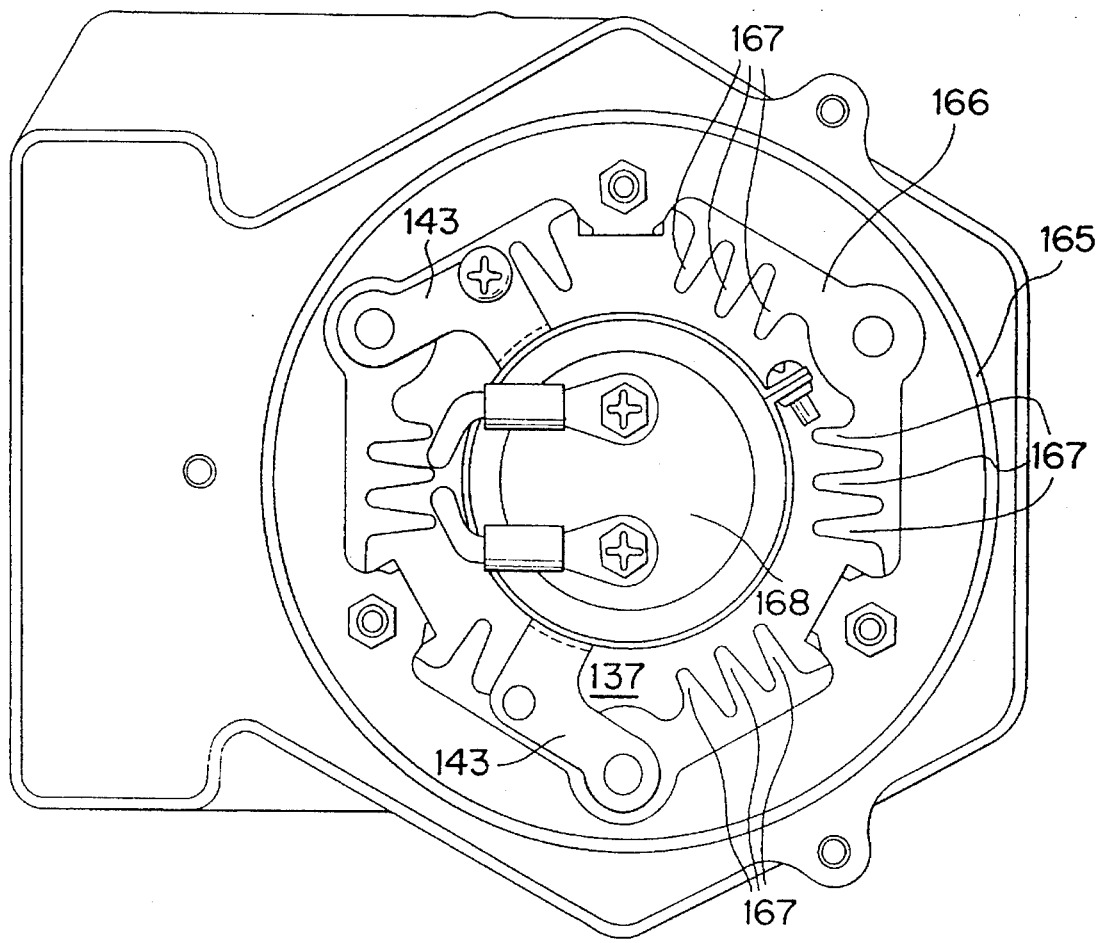
FIG. 19 is a left side view of the principal portion.

The power swing unit 150 is constructed as shown in FIG. 17. The electric motor 152, a stepless transmission 153 and a final reduction mechanism 154 are integrally mounted to the case body 151 wherein the front end is supported pivotably by the vehicle body frame 111. The case body 151 is formed by the casting of an aluminum alloy for example, and a recess 151*a* is formed in a front right-hand side portion of the case body and a recess 151*b* formed in a rear left-hand side portion thereof.

In the case body 151, a motor case 160 is fixed to the front right-hand recess 151*a* to define a motor chamber 131 for accommodating the electric motor 152, while a bearing member 157 is fixed to the rear left-hand recess 151*b* to define a gear chamber 158 for accommodating the final reduction mechanism 154. Further, a side cover 155 is fixed to the left side portion of the case body to define a transmission chamber 156 for accommodating the stepless transmission 153. The motor chamber 131 and the transmission chamber 156 are in communication with each other for ventilation through a through hole 134 formed near the bottom of the recess 151*a* of the case body 151. The transmission chamber 156 is open to the atmosphere through an exhaust port, not shown.

Figure 24:
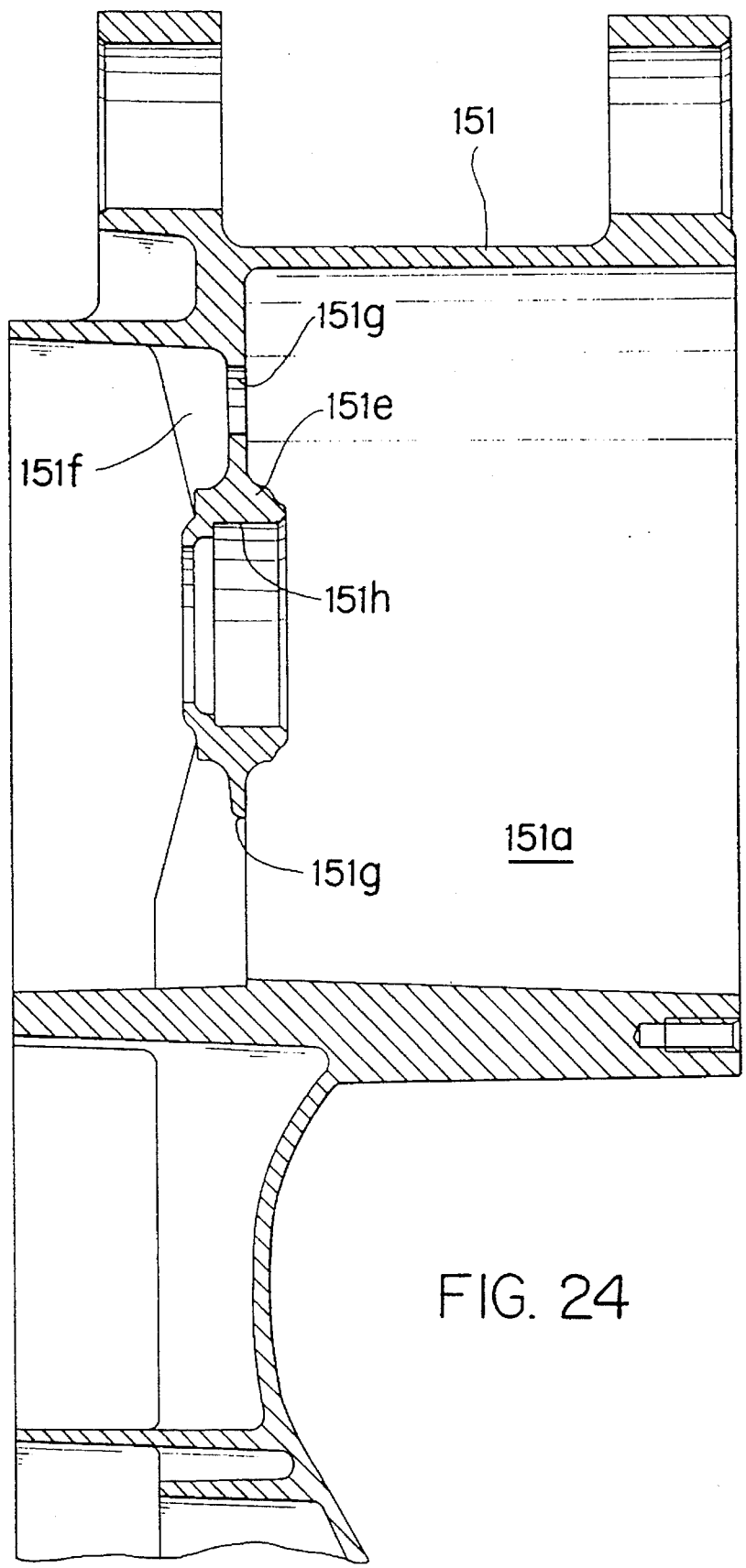
FIG. 24 is a partially sectional view showing another mode of a motor case in the power unit for a motor vehicle.
Figure 25:
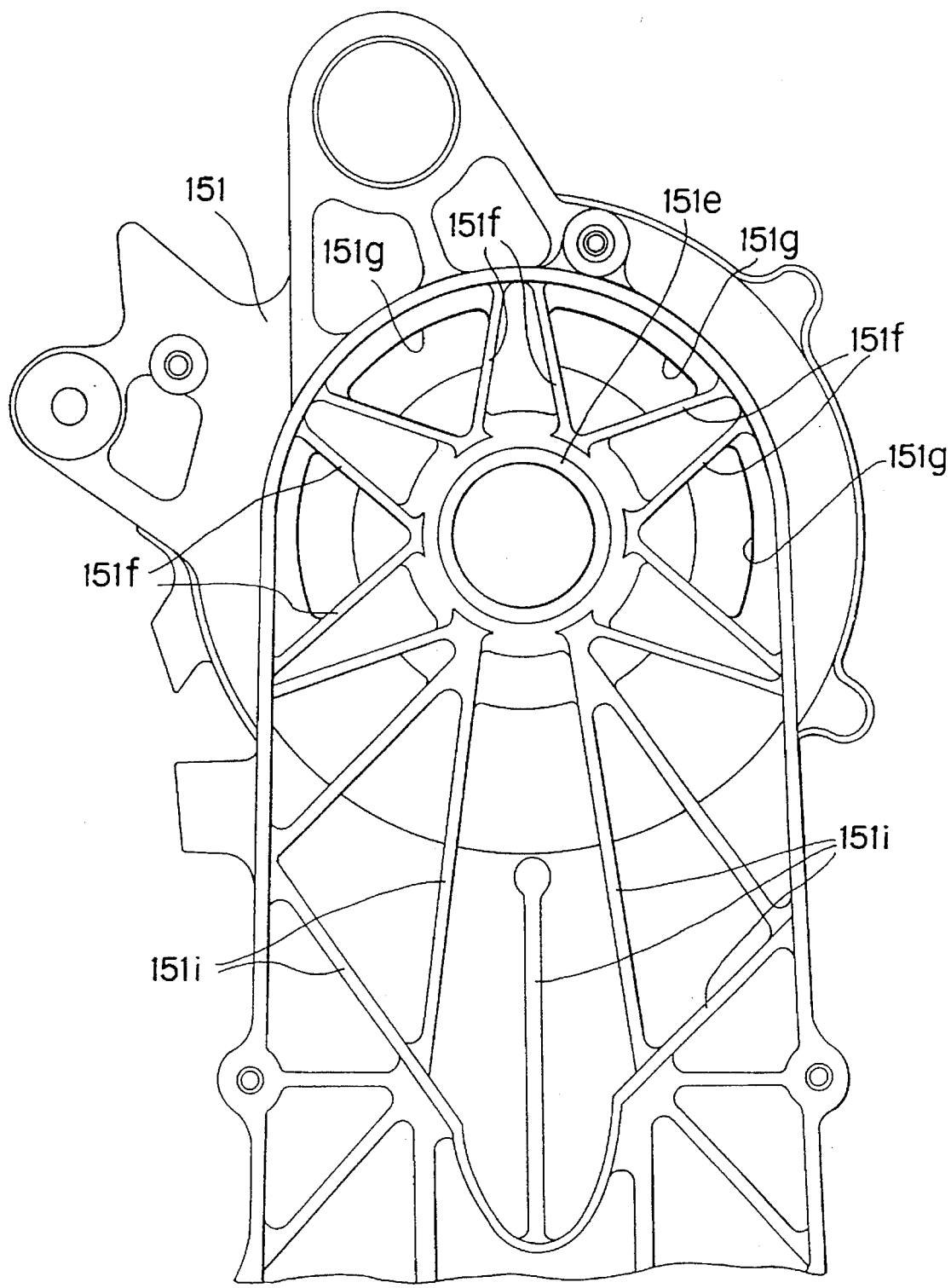
FIG. 25 is a partial left side view of the motor case.
Figure 26:
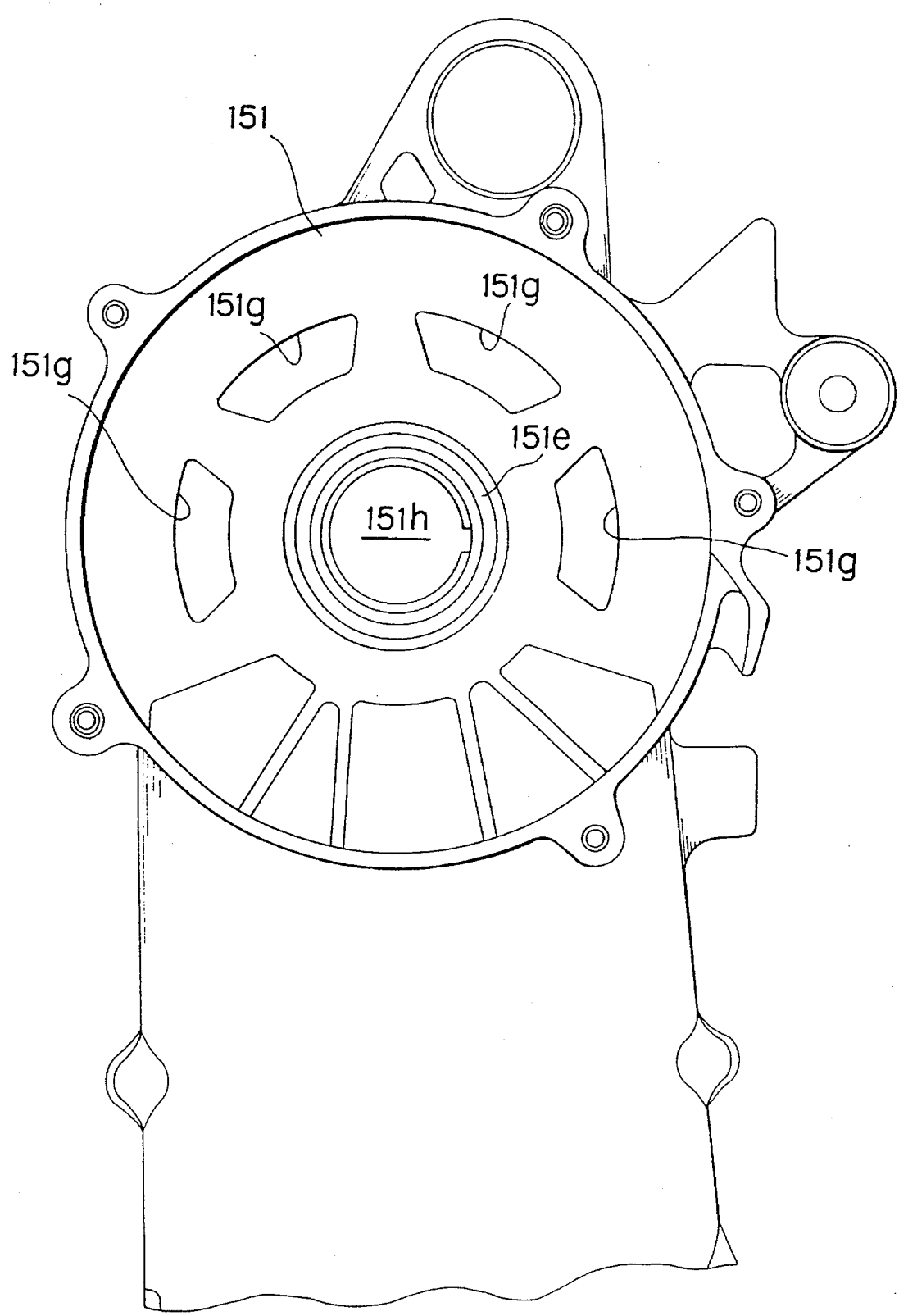
FIG. 26 is a partial right side view of the motor case.
Figure 27:
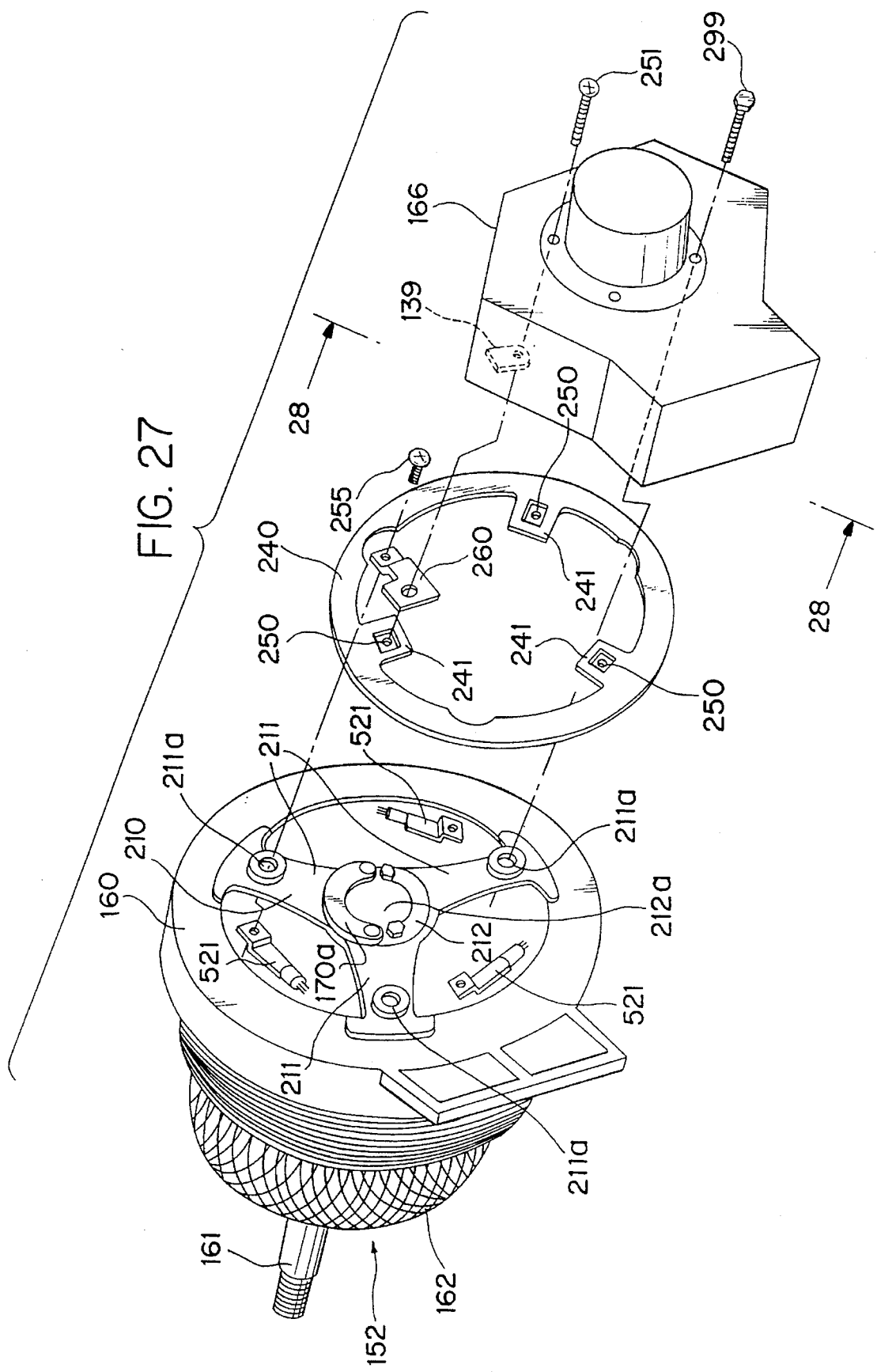
FIG. 27 is an exploded perspective view of a principal portion of a power unit for a motor vehicle according to a further embodiment of the present invention.

It is also possible to construct the case body 151 as illustrated in FIGS. 24, 25 and 26. As shown in FIGS. 24, 25 and 26, in the case body 151, a boss 151*e* is formed centrally of the bottom of the recess 151*a*. A plurality of spoke-like ribs 151*f* are formed on the left side face of the case body and extend radially outward from the boss 151*e*. Through holes 151*g* are formed each between adjacent ribs 151*f*. In the box 151*e* is formed a through hole 151*h*, through which there extends a rotating shaft 161 of an electric motor as will be described later. The through holes 151*g* are formed in a corresponding relation to a cooling fan which will be described later, and cooling air flows through the through holes 151*g* into the transmission chamber 156. In FIG. 25, a rib 151*i* is provided for improving rigidity.

The motor case 160 is in the form of a bottomed cylinder having one open end and it is fixed with bolts 130 to the case body 151 in an aligned state of the opening with the opening of the recess 151*a* to define the motor chamber 131. At the bottom of the motor case 160 there is provided a bearing 132, and the rotating shaft 161 is supported rotatably by both the bearing 132 in the motor chamber 131 and a bearing 133 disposed at the bottom of the recess 151*a* of the case body 151.

One end of the rotating shaft 161 extends through the bottom of the recess 151*a* and is connected to the stepless transmission 153 in the transmission chamber 156, while an opposite end thereof extends through the bottom of the motor case 160. A cooling fan 159 is mounted on the rotating shaft 161 in close proximity to the bottom of the recess 151*a* in the motor chamber 131 and in a position facing the through hole 134. Further, a rotor 163 including a magnet is fixed onto the rotating shaft 161 in a central position of the motor chamber 131. A rotation sensor 170 is mounted onto an end portion of the rotating shaft extending through the bottom of the motor case 160. As is well known, the rotor 163 including the magnet are positioned inside the stator.

The cooling fan 159, which rotates integrally with the rotating shaft 161, introduces cooling air into the motor chamber 131 through the intake duct 188 and delivers it into the transmission chamber 156 through the through hole 134. The rotation sensor 170 includes a magnet fixed onto the rotating shaft 161 and a magnetism sensitive element such as an MR element mounted to the right-hand face of the bottom of the motor case 160. The magnetism sensitive element is connected to the controller 149. The rotation sensor 170 detects a rotational position and a rotating speed of the rotational shaft 161.

Three stator coils 162 which include the stator are fixed to the left-hand face on the motor chamber 131 side of the motor case 160, and a heat sink 166 is fixed to the right-hand face. The three stator coils 162 are Y-connected together, see FIG. 22, and three terminals are connected to a drive circuit which will be described later. The motor case 160 corresponds to a divided case and constitutes a unit case together with the case body 151.

The heat sink 166 is constituted by a generally hexagonal, cylindrical extrude of an aluminum alloy having an outer periphery which is hexagonal in section, and a large number of cooling fins 167 are formed on the inner periphery of the heat sink. The heat sink 166 is fixed to the motor case 160 by threaded engagement of three bolts 198 extending axially through the heat sink with the motor case 160, and the outer periphery thereof is covered with a cover member 165.

The cover 165 houses therein a substrate 147 provided internally with a gate drive circuit 148, and is fixed to the heat sink 166 with resin 146, e.g. an epoxy resin, filled between the cover 165 and the outside surface of the heat sink 166. An intake port is formed in the cover 165 which is connected to the intake duct 188. The heat sink 166 can also be formed by the casting of an aluminum alloy.

A total of six field effect transistors (FETs) 135*a*, 135*b*, 135*c*, 135*d*, 135*e* and 135*f*, hereinafter represented by the subscript-free numeral where required, are provided on the six faces of the outer periphery of the heat sink 166. One transistor is provided for each face to constitute a drive circuit 164. Further, a power stabilizing capacitor 168 is disposed along the inner peripheral portion of the heat sink. Between the capacitor 168 and the inner peripheral portion of the heat sink 166 is formed a cooling air passage 137 which is in communication with the intake duct 188, with the cooling fins 167 projecting into the cooling air passage 137. The capacitor 168 is connected between plus and minus terminals of each battery 136 in parallel with the drive circuit 164. The FETs 135 can each include plural FETs connected in parallel.

Figure 22:
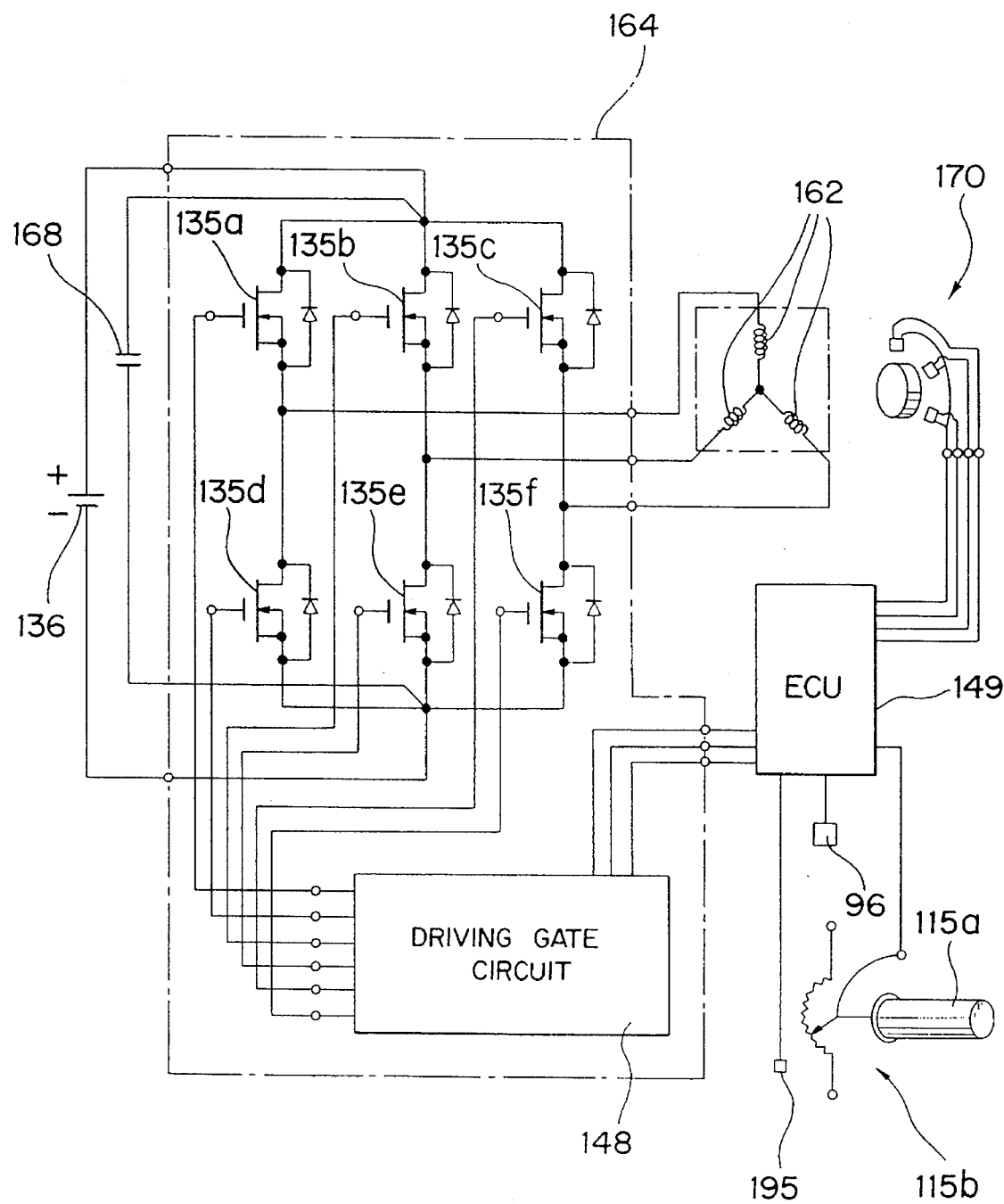
FIG. 22 is an electrical circuit diagram of the power unit for a motor vehicle.

The drive circuit 164 comprises the FETs 135 connected bridgewise, as shown in FIG. 22. More specifically, the source of FET 135a and the drain of FET 135d, the source of FET 135b and the drain of FET 135e, and the source of FET 135c and the drain of FET 135f, are bridgewise connected, respectively. In the drive circuit 164, a line 140 is connected to the plus terminal of each battery 136 and is positioned on one side of the outer periphery of the heat sink 166. A line 141 is connected to the minus terminal of the battery 136 and is positioned on another side of the outer periphery of the heat sink. The drains of FETs 135a, 135b, 135c are connected to the line 140, while the sources of FETs 135d, 135e, 135f are connected to the line 141.

Figure 20:
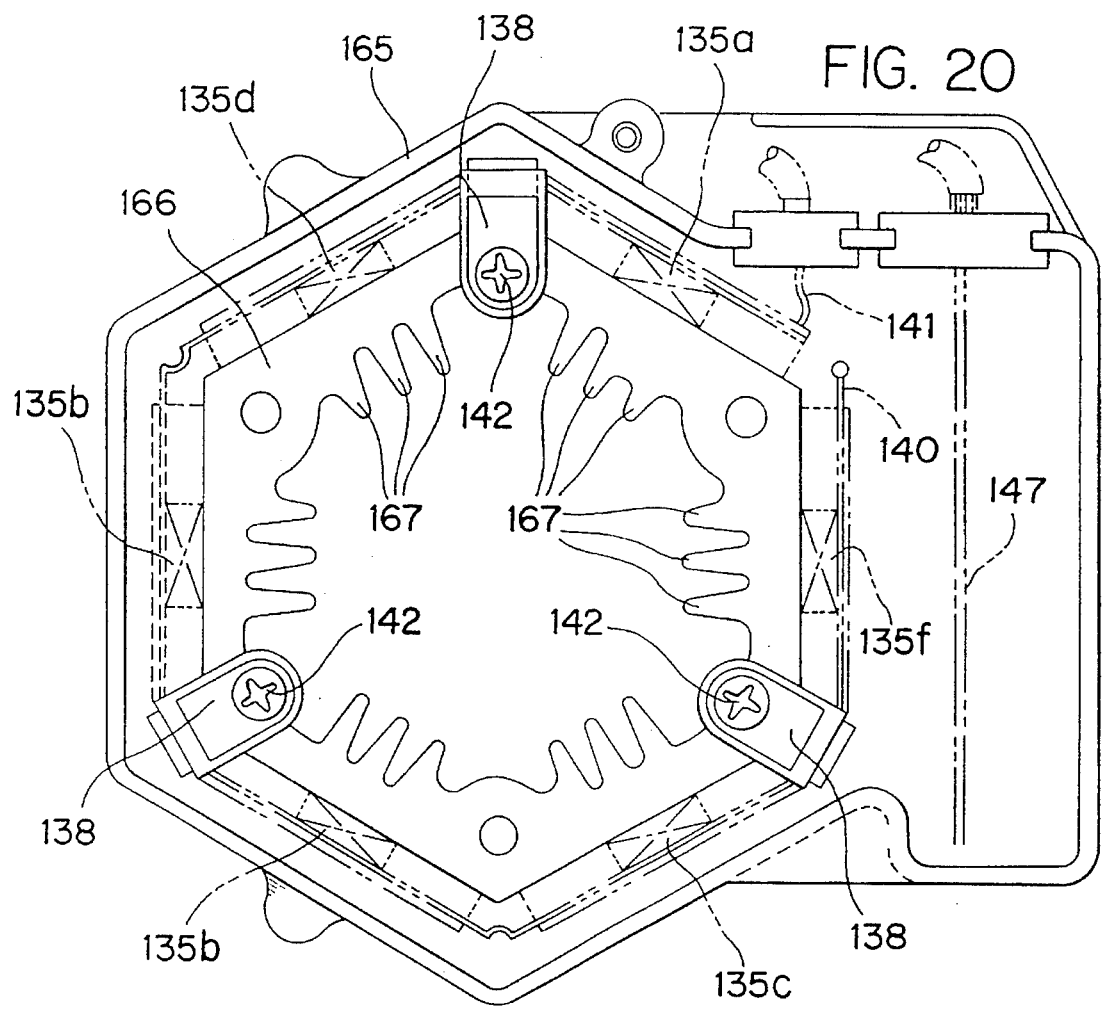
FIG. 20 is a right side view of the principal portion.

As shown in detail in FIGS. 16 and 17, terminals 139 are connected between the sources and the drains of the FETs 135 and end portions of the three terminals 139 are each covered with an insulator 143 and secured to an end face of the heat sink 166 with bolts 142. The bolts 142 are inserted along the inner periphery of the heat sink 166 from the case body 151 side until their end portions project to the exterior of the cover 165 through a boss portion 165b which projects from the cover 165 toward the inner periphery of the heat sink 166. As shown in FIG. 20, the three bolts 142 are disposed at approximately equal intervals in the circumferential direction in which a manner that one of the bolts is located in a vertical top position and the other two are located in positions higher than a vertical bottom position.

Figure 21:
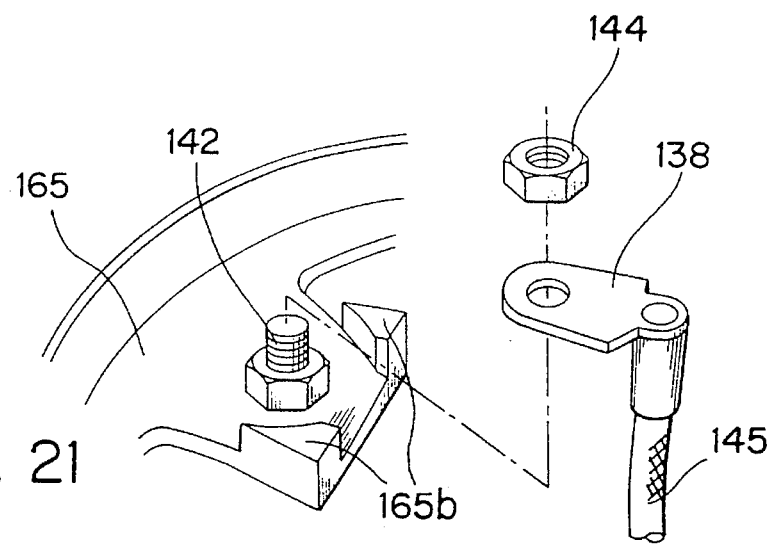
FIG. 21 is an exploded perspective view on a larger scale of a part of the principal portion.

One end on the case body 151 side of the bolts 142 are electrically insulated from the heat sink 166 each through the insulator 143 and are brought into electric conduction with the terminals 139, while opposite ends thereof are connected with terminals 138 outside the cover 165. As shown in FIG. 21, the terminals 138 are each disposed between a pair of ribs 165b for swivel stop formed integrally on the outer surface of the cover 165, then fixed to the bolt 142 with a nut 144 which is threadedly engaged with the end portion of the bolt 142, and thereby connected electrically to the bolt 142. The terminals 138 are connected to the stator coils 162 through lines 145 laid along the inner periphery of the heat sink 166 and are connected between the sources and the drains of FETs 135. The line 140, etc. for connection of these FETs 135 terminals 139 with the batteries 136 are coated with the resin 146 filled between the outer periphery of the heat sink 166 and the cover 165.

The gates of the FETs 135 are connected to the gate drive circuit 148 in the substrate 147. As shown in FIG. 22, the gate drive circuit 148 includes a booster circuit, etc. and is connected to the controller 149 and outputs a drive signal to the FETs 135 on the basis of an output signal provided from the controller 149. In FIG. 22, an accelerator sensor 115b is provided for detecting an operation angle of the accelerator grip 115a. A brake sensor 195 is provided for detecting the operation of a brake. A vehicle speed sensor 196 is provided for detecting the vehicle speed, the sensors 115b, 195 and 196 are connected to the controller 149.

The stepless transmission includes stretching a belt 174 between a driving pulley 172 and a driven pulley 173. The driving pulley 172 is mounted on the rotating shaft 161 of the electric motor 152. The driven pulley 173 is mounted-on a sleeve 178 which is mounted rotatably on an input shaft 171 of the final reduction mechanism 154. The driven pulley 173 is connected in parallel to the input shaft 171 through first and second centrifugal clutches 175, 176.

The driving pulley 172 includes a fixed face 172a fixed to the rotating shaft 161 and a movable face 172b mounted axially movably on the shaft 161. In the drive pulley 172, the movable face 172b is driven by a governor mechanism 177 having a weight 177a and thereby moves axially, resulting in the diameter of the belt 174 on the pulley changes in accordance with the rotating speed of the rotating shaft 161.

Likewise, the driven pulley 173 comprises a fixed face 173a fixed to the sleeve 178 and a movable face 173b supported axially movably on the sleeve 178. In the driven pulley 173, the movable face 173b is urged to the fixed face 173a side by means of a spring 180a disposed in a compressed state between the second centrifugal clutch 176 and a clutch outer 179. The movable face 173b moves in accordance with the change in the belt diameter on the driving pulley 172 to change the belt diameter on the driven pulley.

In the second centrifugal clutch 176, the clutch outer 179 is fixed to the sleeve 178. A clutch inner 180 is provided in a clutch outer 181 of the first centrifugal clutch 175. The second centrifugal clutch 176 is engaged and released according to the rotating speed of the clutch outer 181 of the first centrifugal clutch 175. In the first centrifugal clutch 175, the clutch outer 181 is fixed to the input shaft 171, and a clutch inner 182 is provided in the clutch outer 179 of the second centrifugal clutch 176. The first centrifugal clutch 175 is engaged and released according to the rotating speed of the clutch outer 179 of the second centrifugal clutch 176. The first centrifugal clutch 175 is engaged at a number of revolutions somewhat smaller than that of a maximum efficiency of the electric motor 152, while the second centrifugal clutch 176 is engaged at a number of revolutions smaller than that at which the first centrifugal clutch 175 is engaged. A detailed explanation of the structures of the first and second centrifugal clutches 175, 176 is here omitted for brevity.

The final reduction mechanism 154 has a gear 171a fixed onto the input shaft 171, gears 183a and 183b fixed onto an intermediate shaft 183, and a gear 184a fixed to an output shaft 184. The gears 171a and 183a are in mesh with each other, while the gears 183b and 184a are also in mesh with each other. The input shaft 171 is supported rotatably by both the case 151 and the bearing member 157. As mentioned above, the left end portion of the input shaft 171 projects into the transmission chamber 156 and is connected with the stepless transmission 153. The output shaft 184 is projecting to the right-hand side of the case 151, and the rear wheel 114 is fixed to an end portion of the output shaft 184. The operation of this embodiment will be described below.

In a motor-driven two-wheeled vehicle according to the present invention, the electric power of the batteries 136 is supplied to the electric motor 152 of the power swing unit 150 by means of the drive circuit 164. The rear wheel 114r is driven by the motor 152, thereby causing the vehicle to run. Output signals provided from accelerator sensor 194 and vehicle speed sensor 196 are subjected to an arithmetic processing in the controller 149 and the electric power to be fed to the motor 152 is controlled in accordance with the operation of the accelerator grip 115a and the vehicle speed.

In the power swing unit 150, the recess 151a is formed in the case body 151. The motor case 160 is connected to the recess 151a of the case body 151 to define the motor chamber 131. The rotating shaft 161 and stator coils 162 are disposed within the motor chamber 131 to mount the electric motor 152. The heat sink 166 is fixed to the motor case 160, and FETs 135 which constitute the drive circuit 164 are mounted to the heat sink 166. Consequently, the wiring 145 between the stator coils 162 and the drive circuit 164 can be shortened, and it is possible to attain a reduction of size because any special parts are not required for the mounting of the drive circuit 164.

In the power swing unit 150, the motor case 160 is formed in the shape of a bottomed cylinder having a face for connection with the case body 151 at an axially intermediate portion of the rotating shaft 161. The heat sink 166 is provided in the motor case 160. In addition, the bearing 132, for the rotating shaft 161, and the rotation sensor 170 are provided within the motor case 160.. Consequently, the number of parts can be decreased as a whole and it is possible to attain a further reduction of size.

The stator coils 162 which constitute the stator are fixed to the motor case 160, so it is possible to mount the stator coils 162, the rotations sensor 170, etc. beforehand to the motor case 160. Thereafter, the case 160 is mounted on the case body 151 with the stator coils 162, etc. already mounted therein. Thus, this assembling operation is easy.

In the power swing unit 150, moreover, the heat sink 166 is formed in a generally hexagonal shape in section, then FETs 135 which are provided in the drive circuit 164 are attached to the outer faces of the hexagon. Thereafter, the outer surface of the heat sink 166 is covered with the cover 165, and resin is filled between the cover 165 and the heat sink 166 to coat the FETs 135 and terminals 139. Therefore, it is possible to fix the FETs 135, etc. firmly and protect them effectively against dust and water.

The stator coils 162 of the electric motor 152 and the drive circuit 164 are connected together through three bolts 142 which are inserted at equal intervals in the circumferential direction along the inner periphery of the heat sink 166. The bolts 142 are arranged in a distributive manner so as not to assume the lowest vertical position of the heat sink. Therefore, even in the event of stagnation of water which has entered the lower portion of the heat sink 166, no inconvenience, e.g. electrical contact with the water, will occur.

Since the bolts 142 extend through the boss portion 165b of the cover 165 to keep the spacing from the fins 167 of the heat sink 166, it is not necessary to use collars or the like for insulation and hence it is possible to decrease the number of parts. Further, since the cover 165 is integrally formed with ribs 165b serving as swivel stop ribs for the terminals 138, the operation for connection of the terminals 138 is easy.

Figure 23:
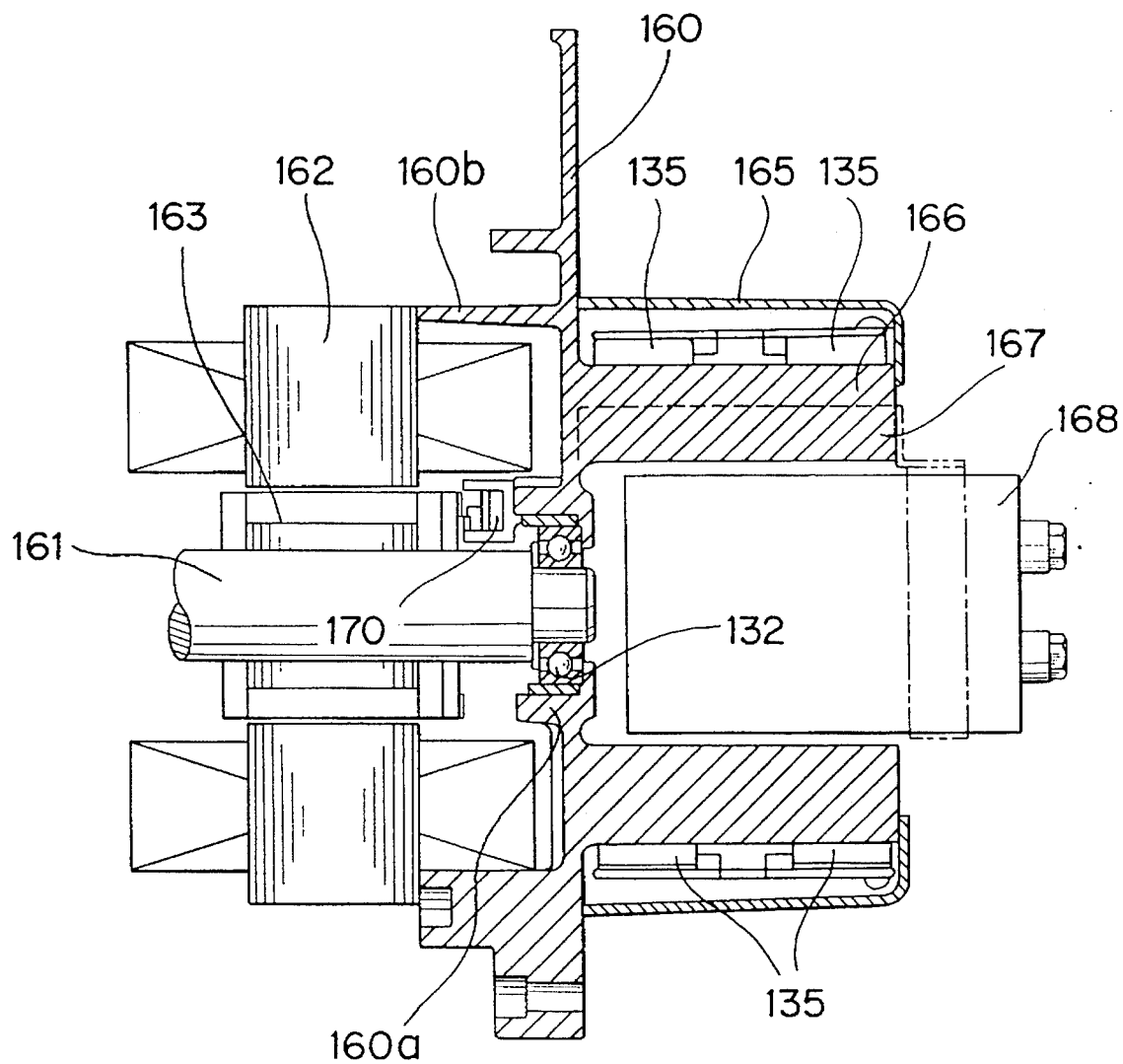
FIG. 23 is a sectional view of a principal portion of a power unit for a motor vehicle according to another embodiment of the present invention.

FIG. 23 illustrates a power unit for a motor vehicle according to another embodiment of the present invention. FIG. 23 is an enlarged sectional view of a principal portion, in which the same portions as in the above embodiment are indicated by the same reference numerals and explanations thereof are omitted.

In this embodiment, as shown in FIG. 23, a heat sink 166 is formed integrally with a motor case 160. In the motor case 160, a bearing portion 160a is formed centrally in the axial direction, the heat sink 166 is formed on the right-hand side, and a cylindrical portion 160b which covers stator coils 162 is formed on the left-hand side. A bearing 132 is provided in the bearing portion 160a which supports a rotating shaft 161. A rotation sensor 170 is disposed on the left-hand side of the bearing 132 in close proximity thereto.

According to this embodiment, since the heat sink 166 is formed integrally with the motor case 160, it is possible to further decrease the number of parts, and the assembling operation can be accomplished very easily. In addition, since the rotation sensor 170 is disposed on the side opposite to the heat sink 166, it is possible to prevent the interference thereof and also possible to attain a further reduction of size.

FIGS. 27 to 35 illustrate a further embodiment of the present invention. In this embodiment, the same members as in the above embodiments are indicated by the same reference numerals and explanations thereof will be omitted.

Figure 36:
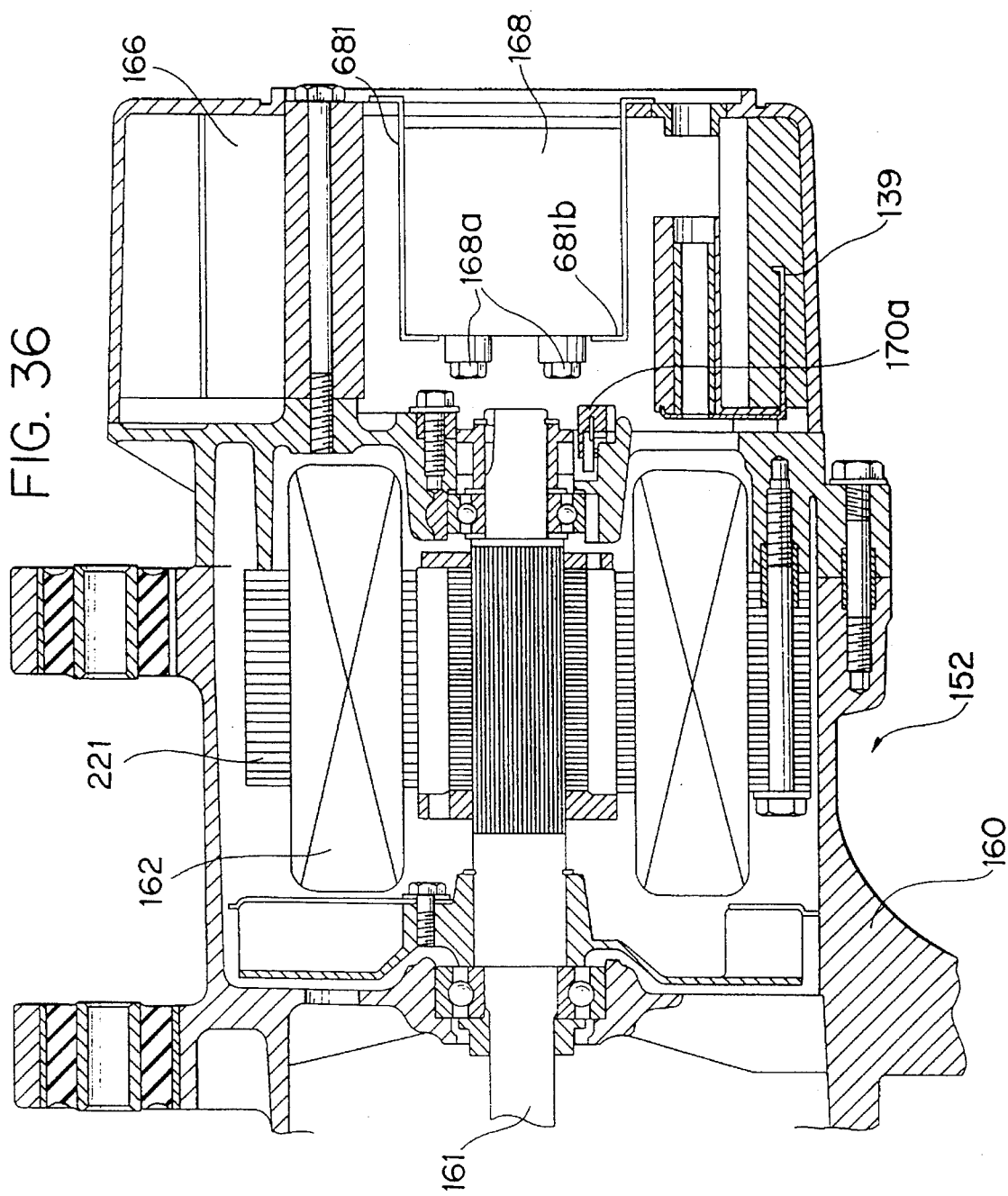
FIG. 36 is a sectional view of a principal portion of a power unit for a motor vehicle according to a still further embodiment of the present invention.
Figure 37:
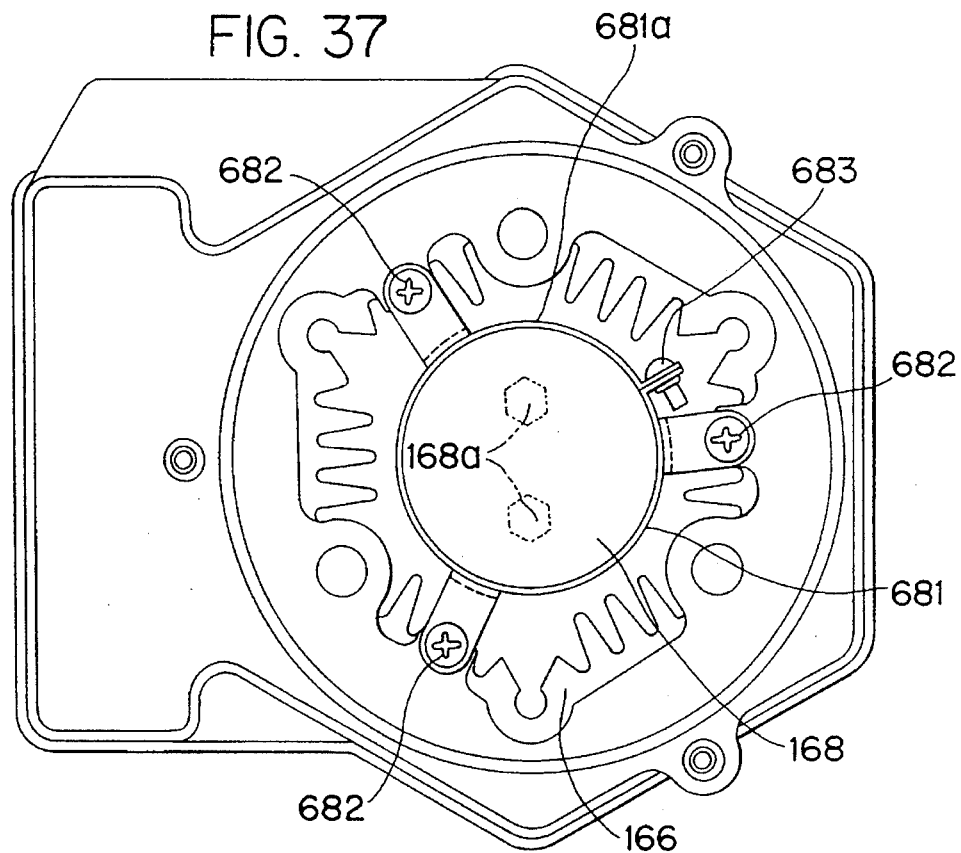
FIG. 37 is a right side view of the principal portion.

In this embodiment, a motor case 160 is formed in the shape of a cylinder with right and left ends both being open. Coils 162 are each wound around a core 221, see FIG. 36 relating to a still further embodiment as will be described later, which are disposed within the motor case 160 and fixed therein. As shown in detail in the drawings, three connecting terminals 521 are disposed on a right end face of the core 221 and positioned at equal intervals in the circumferential direction. The connecting terminals 521, with a nut 521a, see FIG. 34, fixed to each of them, are connected to three terminals of the coils 162 which are Y-connected as is apparent also from the circuit diagram of FIG. 22 explained previously. A fixing machine screw 255 is threadedly engaged with the nut 521a, and the connecting terminals 521 are each brought into conduction with a terminal 260 electrically through the fixing machine screw 255, as will be described later.

Figure 40:
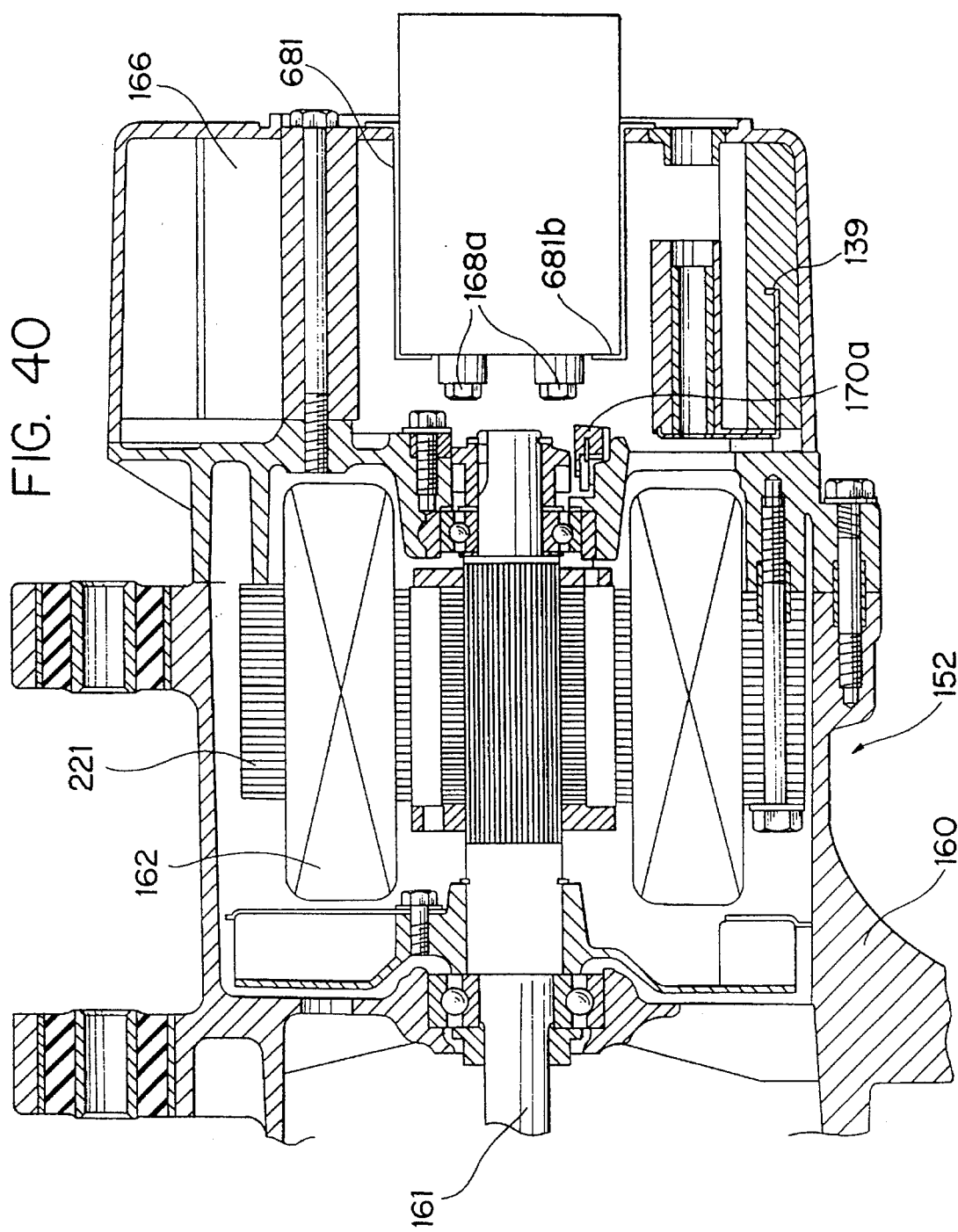
FIG. 40 is a sectional view showing another mode in the power unit for a motor vehicle.

A mounting member 210 is fixed to the right end opening of the motor case 160, and a heat sink 166 is attached to the mounting member 210 through a terminal plate member 240. The mounting member 210 has a Y shape comprising three spoke portions 211 and a boss portion 212 which are molded together integrally. The spoke portions 211 are each positioned between adjacent connecting terminals 521 and in this state the heat sink is fixed to the mounting member 210. A mounting boss 211a having a threaded hole is formed on a front end side of each spoke portion 211, and a through hole 212a for supporting a rotating shaft is formed in the boss portion 212. A rotating shaft 161 is inserted through the through hole 212a rotatably through a bearing 132. A magnetism sensitive element 170a, as illustrated in FIG. 40, will be described later in connection with a still further embodiment.

As also shown in FIGS. 31 to 35, the terminal plate 240 is disk-like and formed of an electrical insulating material. From the inner periphery of the terminal plate 240 three nut holder portions 241 project radially inwards at equal intervals. In each nut holder portion 241, there is formed a rectangular concave 241a which is open on the right-hand side thereof, and a slot 241b for registration is formed in a side wall portion on the counterclockwise side of the concave 241a.

In the terminal plate 240, a square nut 250 is loosely fitted in the concave 241a of each nut holder portion 241, and a connecting bolt 251 which will be described later is brought into threaded engagement with the square nut 250 for mounting the associated terminal 260. The size of the concave 241a is larger than that of the square nut 250 to permit a predetermined wobbling motion of each nut 250. For example, if one side of the concave 241a is assumed to be 10, one side of the square nut 250 is set to 9.5 or so, and in this case, the diameter of an insertion hole formed in each terminal 260, which will be described below, is set to 6, while that of each connecting bolt 251 is set to 5. The concave 241a may be formed as a square through hole.

As shown in FIGS. 32 to 35, the terminals 260 are each formed in a stepped shape using an electroconductive material, e.g. brass, by a pressing operation for example. Insertion holes 260a and 260b are formed in the stepped portions, respectively, and a lug 260c for registration is formed on the insertion hole 260a side. The lug 260c is fitted in the corresponding slot 241b to restrict the position of the terminal 260. The connecting bolt 251 engaged threadedly with each square nut 250 is inserted into the insertion hole 260a, and the fixing machine screw 255 engaged threadedly with the nut of each connecting terminal 521 is inserted into the insertion hole 260b. As shown in the drawings, the terminals 260 are connected for electrical conduction with the connecting terminals 521 of the electric motor 152 through the fixing machine screws 255. Further, as will be described below, the terminals 260 are also brought into electrical conduction with terminals 139 for power supply of the heat sink 166 through the connecting terminals 521, see FIG. 35.

Figure 28:
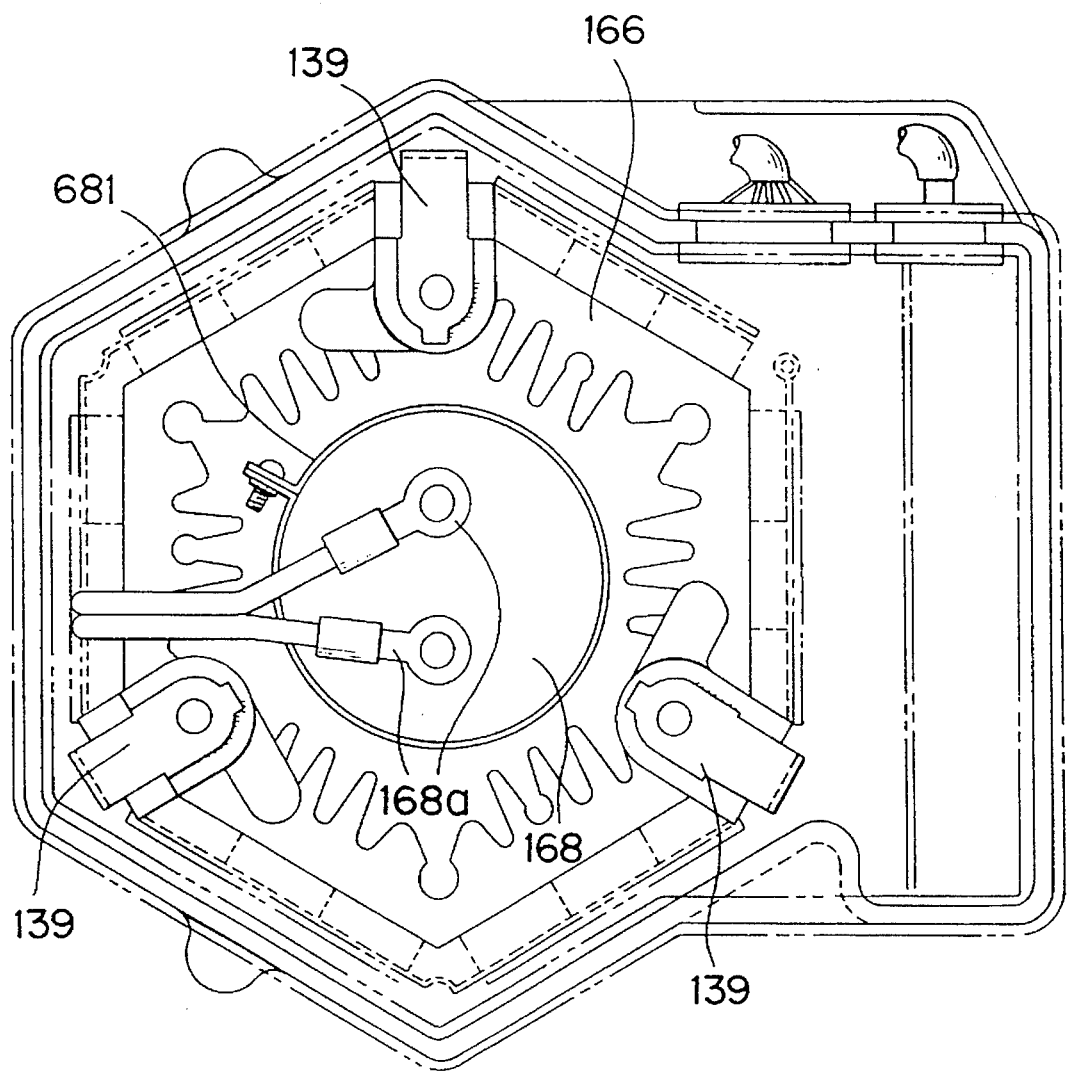
FIG. 28 is a view as seen in the direction of arrows 28—28 in FIG. 27.
Figure 29:
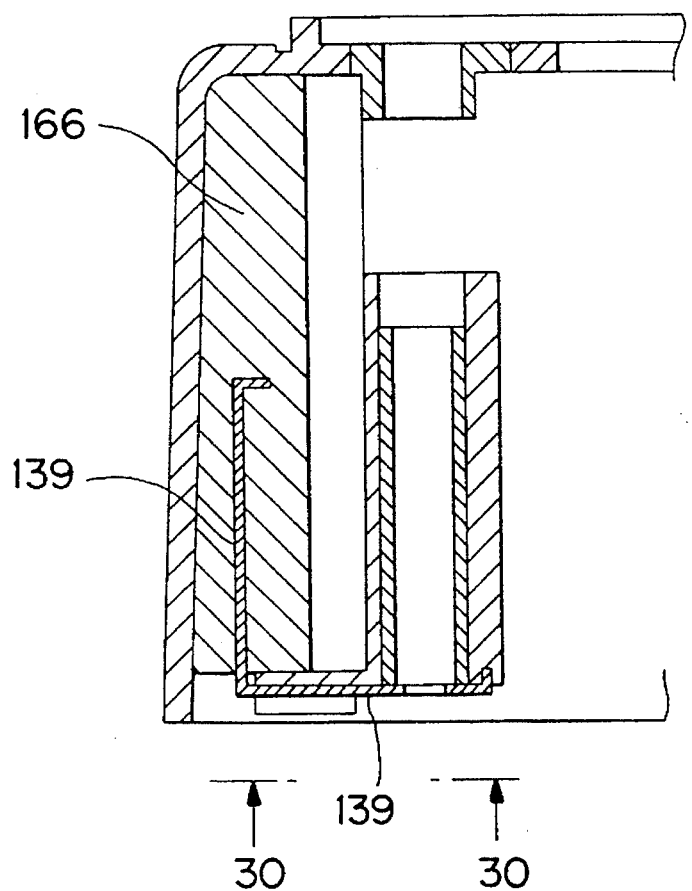
FIG. 29 is a partially enlarged sectional view of the power unit for a motor vehicle.
Figure 30:
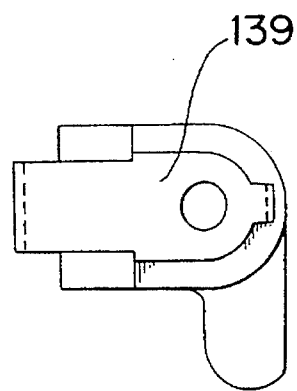
FIG. 30 is a view as seen in the direction of arrows 30—30 in FIG. 29.
Figure 31:
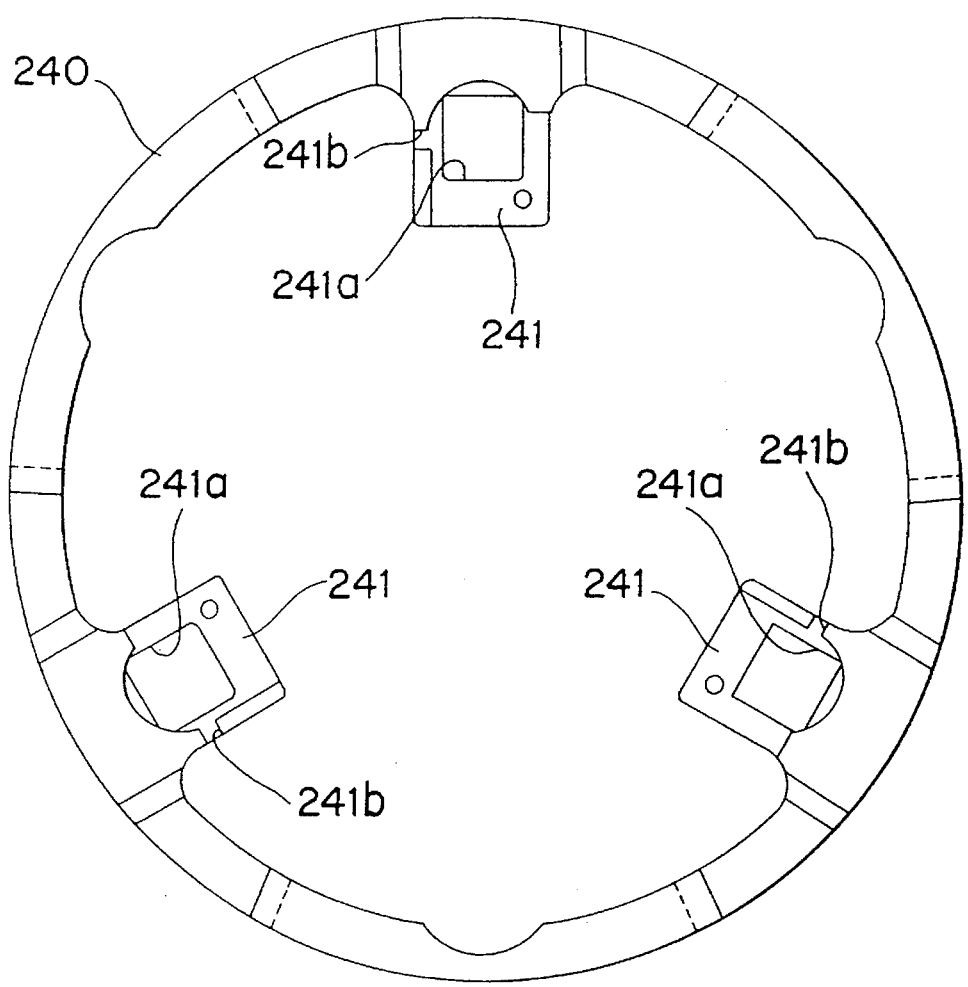
FIG. 31 is a view showing main parts of the power unit for a motor vehicle.
Figure 32:
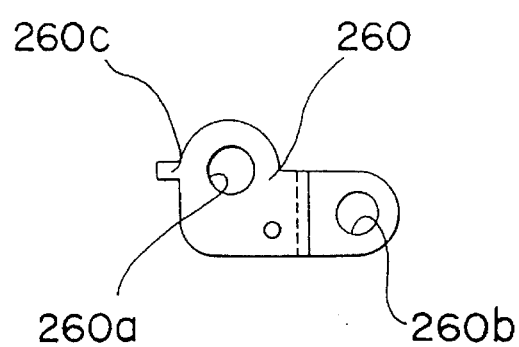
FIG. 32 is a view showing other main parts of the power unit for a motor vehicle.
Figure 33:
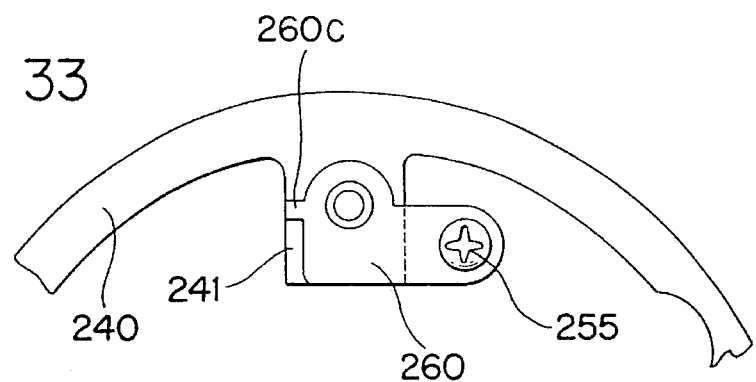
FIG. 33 is a partially enlarged view of the power unit for a motor vehicle.
Figure 34:
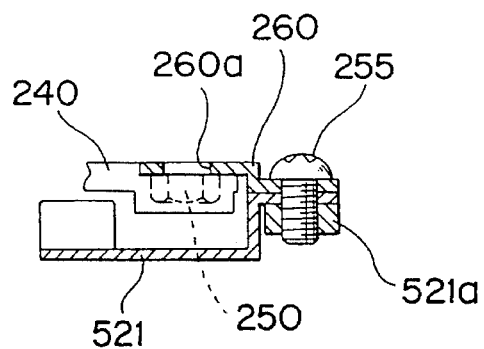
FIG. 34 is a sectional view of a principal portion of the power unit for a motor vehicle.
Figure 35:
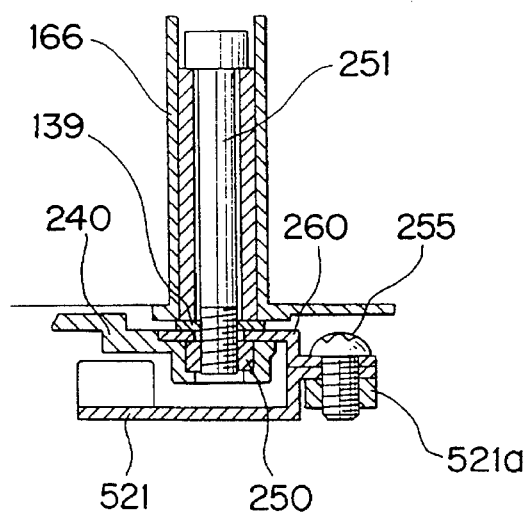
FIG. 35 is a sectional view of another principal portion of the power unit for a motor vehicle.

As shown also in FIGS. 28 to 30, three power supply terminals 139 are disposed on a left end face of the heat sink 166 and positioned at equal intervals. The connecting bolts 251 and fixing bolts 299 are inserted through the end face from the right-hand side. As shown in FIG. 35, the connecting bolts 251 come into threaded engagement with the square nuts 250 of the terminal plate 240 to bring the terminals 260 and the power supply terminals 139 into electrical conduction with each other. The fixing bolts 299 come into threaded engagement with the threaded holes formed in the bosses 211a of the spoke portions 211 of the mounting member 210 to fix the heat sink 166 to the mounting member 210, namely, the motor case 160.

For mounting the heat sink 166 to the motor case 160 in this embodiment, first the lugs 260c of the terminals 260 are retained in the slots 241b formed in side walls of the concaves 241a of the terminal plate 240, on the right-hand side of the terminal plate. In this state the fixing machine screws 255 are inserted through the insertion holes 260b into threaded engagement with the nuts of the connecting terminals 521 of the electric motor 152 to hold the terminal plate 240 between the terminals 260 and the mounting member 210. At this time, the connecting terminals 521 and the terminals 260 conduct electrically and contact with each other as shown in FIG. 35.

Thereafter, the fixing bolts 299 and the connecting bolts 251 are inserted from the right-hand side of the mounting member 210 so that the bolts 299 are threadedly engaged with the threaded holes formed in the bosses 211a of the mounting member 210 and the bolts 251 are threadedly engaged with the square nuts 250 of the terminal plate 240. Consequently, the heat sink 166 is fixed to the motor case 160, namely, the mounting member 210, and as shown in the drawing, the terminals 260 and the power supply terminals 139 come into contact with each other while maintaining electrical connection.

In this embodiment, as described above, the power supply terminals 139 of the heat sink 166 and the connecting terminals 521 of the electric motor 132 can be brought into electrical conduction with each other by means of the terminals 260 of the terminal plate 240 without the use of wiring. Consequently, the operation for the connection of wiring is not required at the time of mounting the heat sink 166 and hence the heat sink can be mounted easily.

FIGS. 36 to 39 illustrate a still further embodiment of the present invention. The same elements as in the previous embodiments are indicated by the same reference numerals and explanations thereof will be omitted.

According to this embodiment, a capacitor 168 is mounted along the inner periphery of a heat sink 166 by means of a mounting stay 681. As shown in detail in the drawings, the mounting stay 681 has an annular band portion 681a and a stopper portion 681b. The annular band portion 681a clamps the outer periphery of the capacitor 168 through a machine screw 683, while the stopper portion 681b is brought into engagement with a left end face of the capacitor 168. The mounting stay 681 is fixed to a right end face of the heat sink 166 at three points with machine screws 682 to mount the capacitor 168 to the heat sink 166. As is shown clearly in FIG. 36, a right end face of the capacitor 168 is positioned more to the left than the right end face of the heat sink 166. In other words, the capacitor 168 is buried completely into the inner periphery portion of the heat sink 166. Further, the capacitor 168 is disposed in such a manner that connecting terminals 168a are positioned on the left-hand side, that is, the portion of the capacitor where the connecting terminals 168a are provided faces the left-hand side, see FIG. 28.

Figure 39:
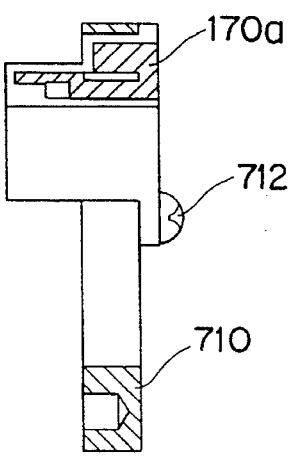
FIG. 39 is a sectional view thereof.
Figure 38:
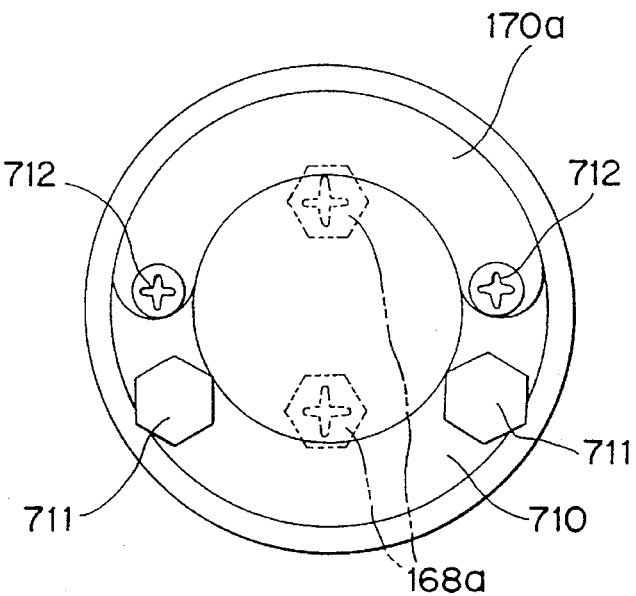
FIG. 38 is an enlarged view of a principal portion of the power unit for a motor vehicle.

In this embodiment, as shown in FIGS. 38 and 39, a magnetism sensitive element 170a of a rotation sensor 170 is mounted to an annular sensor stay 710 with machine screws 712 and the sensor stay 710 is mounted with bolts 711. As is clear from FIG. 38 and 39, the magnetism sensitive element 170a is coated with resin and projects at a predetermined height on the right-hand side, and the connecting terminals 168a of the capacitor 168 are positioned symmetrically with respect to the sensor stay 710.

According to this embodiment, since the capacitor 168 is disposed so that the connecting terminals 168a face the electric motor 152 side, it is possible to prevent the connecting terminals 168a of the capacitor from coming into contact with other devices, etc. Besides, since the capacitor 168 is buried in the heat sink 166, it is possible to prevent its abutment with external devices. Further, since the left end face of the capacitor is retained by the stay, its leftward displacement can be prevented effectively.

The capacitor 168 may be disposed in such a manner that a right end portion projects from the inner peripheral portion of the heat sink 166, as shown in FIG. 40. Also in this case, the terminals 168a of the capacitor 168 can be prevented from contact with external devices because they face inwards. Other constructional points as well as the function and effect are the same as in the above embodiments, so explanations thereof are here omitted.

The heat sink is fixed to the motor case integral with the case body and the switching elements which constitute the drive circuit are mounted to the heat sink. Thus, it is possible to shorten the wiring for connection between the drive circuit and the electric motor, and reduce the size of the unit.

The switching elements-mounted portion of the heat sink is covered with the cover member and resin is filled between the cover member and the heat sink. Thus, it is possible to firmly fix the switching elements and wiring and protect the switching elements, etc.

The heat sink, the bearing for the rotating shaft and the rotation sensor are mounted in a divided case which is divided from the case body in an intermediate position of the rotating shaft and the rotation sensor is disposed on the side axially opposite to the heat sink with the bearing positioned therebetween. Thus, it is possible to avoid interference with the heat sink and attain a further reduction of size.

A construction is adopted wherein the stator is mounted to the divided case. Thus, it is possible to mount the stator beforehand to the divided case and hence the assembly thereof becomes easier.

A construction is provided wherein the motor case and the heat sink are each provided with terminals. A plate member is disposed in a predetermined position between the motor case and the heat sink, and power supply terminals of the heat sink and connecting terminals of the motor case are rendered conductive with each other through terminals provided on the plate member. Thus, it is not necessary to use wiring and the mounting of the heat sink to the motor case can be easily accomplished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A regenerative braking system for a motor vehicle comprising:

a revolution sensor for detecting the number of revolutions of a drive motor driving said motor vehicle;

an accelerator opening sensor for detecting an accelerator opening;

a discriminator means for discriminating between a regenerative braking mode and a drive mode based on the number of revolutions of the drive motor and the accelerator opening and for producing a signal responsive thereto;

a plurality of switching elements for switching an electric current flowing in said drive motor;

a memory means for storing on-off duty ratio data of said switching elements in the regenerative braking mode in a corresponding relation to the number of revolutions of the drive motor and the accelerator opening; and control means for retrieving said on-off duty ratio data corresponding to the number of revolutions of the drive motor and the accelerator opening from said memory means when the signal generated by the discriminator means indicates that the system is in the regenerative braking mode, and for controlling the switching elements at an on-off duty ratio corresponding to the retrieved on-off duty ratio data to effect regenerative braking.

2. The regenerative braking system for a motor vehicle according to claim 1, wherein approximately a drive motor driving force zero line is set as a boundary between the regenerative braking mode and the drive mode in said discriminator means.

3. The regenerative braking system for a motor vehicle according to claim 1, wherein regenerative braking is employable during high speed operation of the motor vehicle with a zero level of an accelerator signal provided by said accelerator opening sensor.

* * * * *